L. L. LADD.
SORTING MACHINE.
APPLICATION FILED OCT. 27, 1920.

1,396,221.

Patented Nov. 8, 1921.
11 SHEETS—SHEET 1.

Inventor.
Lester L. Ladd.
by Gabel & Mueller attys.

L. L. LADD.
SORTING MACHINE.
APPLICATION FILED OCT. 27, 1920.

1,396,221.

Patented Nov. 8, 1921.
11 SHEETS—SHEET 4.

Inventor,
Lester L. Ladd.
by Gabel & Mueller
Attys.

L. L. LADD.
SORTING MACHINE.
APPLICATION FILED OCT. 27, 1920.

1,396,221.

Patented Nov. 8, 1921.
11 SHEETS—SHEET 5.

Inventor.
Lester L. Ladd.
by Gabel & Mueller
attys.

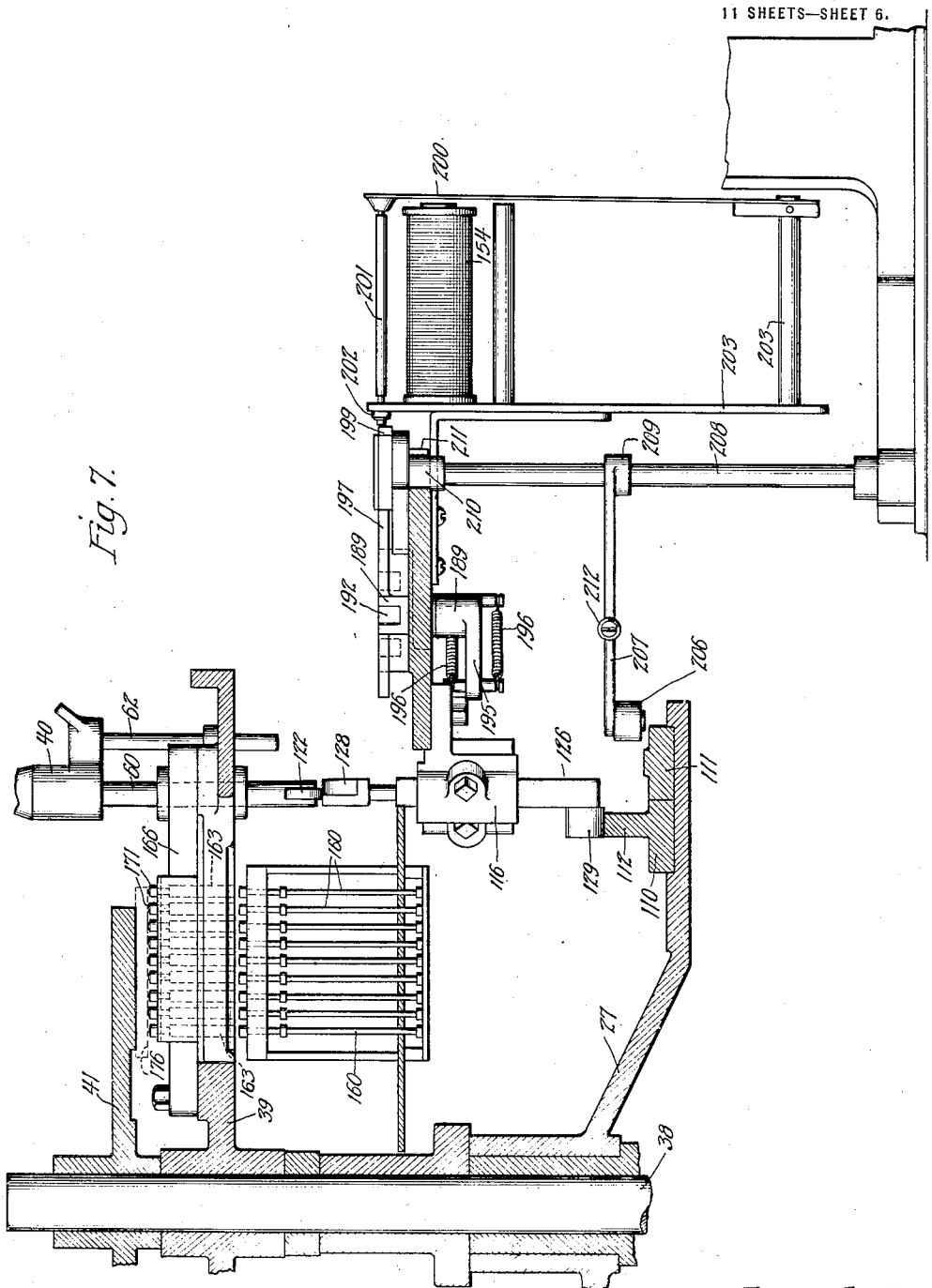

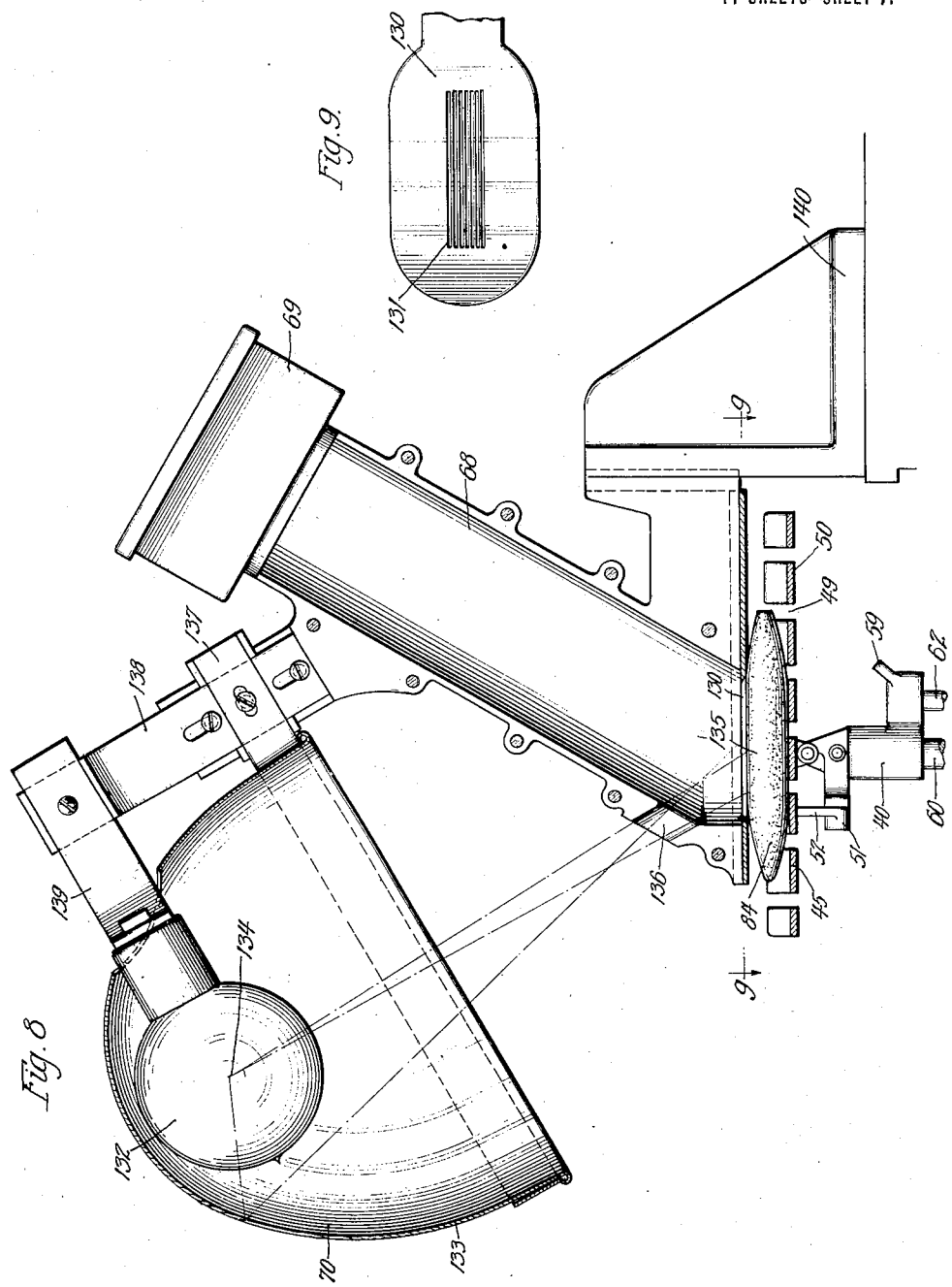

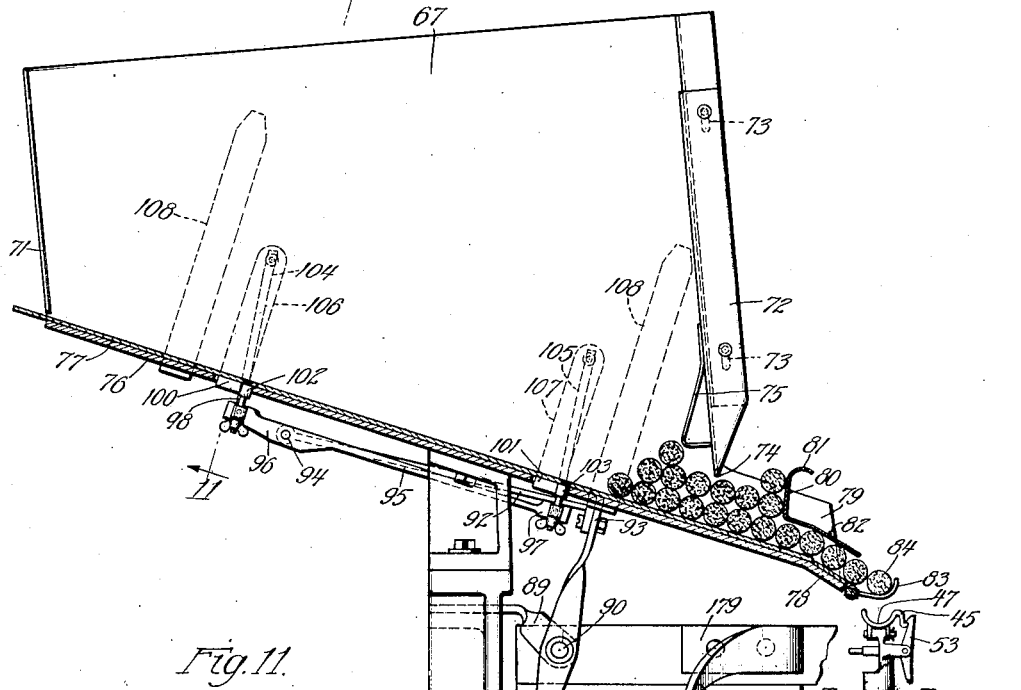

L. L. LADD.
SORTING MACHINE.
APPLICATION FILED OCT. 27, 1920.

1,396,221.

Patented Nov. 8, 1921.
11 SHEETS—SHEET 9.

Inventor.
Lester L. Ladd.
by Gabel & Mueller
attys.

L. L. LADD.
SORTING MACHINE.
APPLICATION FILED OCT. 27, 1920.

1,396,221.

Patented Nov. 8, 1921.

Inventor.
Lester L. Ladd.
by Gabel & Mueller
attys

L. L. LADD.
SORTING MACHINE.
APPLICATION FILED OCT. 27, 1920.

1,396,221.

Patented Nov. 8, 1921.
11 SHEETS—SHEET 11.

Inventor.
Lester L. Ladd.
by Gabel & Mueller
attys.

UNITED STATES PATENT OFFICE.

LESTER L. LADD, OF LOCKPORT, ILLINOIS, ASSIGNOR TO PHOTOMETRIC PRODUCTS CORPORATION, OF LOCKPORT, ILLINOIS, A CORPORATION OF DELAWARE.

SORTING-MACHINE.

1,396,221.     Specification of Letters Patent.     Patented Nov. 8, 1921.

Application filed October 27, 1920. Serial No. 419,848.

*To all whom it may concern:*

Be it known that I, LESTER L. LADD, a citizen of the United States, residing at Lockport, in the county of Will and State of Illinois, have invented a certain new and useful Improvement in Sorting-Machines, of which the following is a full, clear, concise, and exact description, reference being had to the accompanying drawings, forming a part of this specification.

This invention relates to sorting machines, and more particularly to a machine for sorting articles according to color or shade.

The invention relates to a machine for selecting articles in accordance with the color or shade thereof and depositing them at certain predetermined stations so as to assemble all of the articles of a predetermined color or shade in one place.

The invention further relates to a machine whereby articles of various shades or colors are brought into the range of a photoelectric cell and associated devices and are then carried to certain predetermined stations or dumping points in accordance with the effect produced on said cell by the color or shade of the article.

It is a purpose of the invention to provide a sorting machine of the above character that is capable of accurately selecting or grading, articles according to color into a large number of groups where the difference in shade or coloring of the different groups is very slight, in fact the machine is capable of sorting articles in accordance with differences of color that are barely perceptible to the eye.

It is a further purpose of the invention to provide a machine provided with a plurality of article carriers that are adapted to bring the articles successively within the range of a selecting device, which carriers are provided with means set while influencing said selecting device whereby said carriers are actuated to dump the articles carried thereby into chutes emptying into suitable receptacles, thus collecting all the articles of a given color or shade in a particular receptacle.

It is a further object of the invention to provide a machine whereby articles of various colors and shades can be dumped into a hopper indiscriminately and fed automatically from said hopper to mechanism that automatically sorts said articles and deposits them in receptacles containing articles of only one color or shade.

It is a still further object of the invention to provide new and improved feeding mechanism for said machine whereby articles that are fragile can be suitably fed to the machine without damage or injury thereto and to provide new and improved article carriers capable of receiving said articles from said feeding mechanism and of carrying and presenting said articles to the selecting mechanism and subsequently carrying them to a dumping position and dumping them into the proper receptacle without injury or damage to said articles.

It is another purpose of the invention to provide suitable selecting mechanism actuated by a photoelectric cell and associated devices whereby articles are selected according to the influence they have on said cell and to so construct the selecting mechanism as to provide for a large number of selections without unnecessarily multiplying the parts of the machine, this result being obtained by providing a switching mechanism in conjunction therewith, whereby means associated with the article carrier is capable of assuming a plurality of different angular positions at each dumping station, and providing a single dumping mechanism for each of said stations.

It is a further purpose of the invention to provide means whereby the same area of each article that is moved within the range of the selecting mechanism is exposed to influence the selecting mechanism. It is also a purpose of the invention to provide a positive dumping means to take care of all articles handled by the machine that are not within the range of colors of the sorting apparatus.

It is moreover an object of the invention to provide a machine for selecting cigars according to the color thereof, wherein the cigars are fed from a hopper to one of a plurality of carriers arranged in a circular series, which carriers are adapted to move in a circular path in a step-by-step movement, so as to bring the cigars one at a time within the range of a selecting device, which operates suitable devices at that time, whereby the carrier dumps the cigar into its proper chute leading to a receptacle for the same, in accordance with the color thereof.

It is also an object of the invention to provide means for returning the carriers to their normal cigar supporting position after they have completed their movement about the said circular path and raise them into proper position to receive a cigar from the feeding mechanism.

Other objects and advantages of the invention will appear as the description of the accompanying drawings showing one form that my invention may take, proceeds. However, I desire to have it distinctly understood that I do not intend to limit myself to the exact details of structure shown therein, and described in the specification, but desire to include as part of my invention all such obvious changes of structure and modifications of parts, as would occur to a person skilled in this art and as would fall within the scope of the claims.

In the drawings:—

Fig. 7 is a section taken on the line 7—7 of Fig. 1 looking in the direction of the arrows;

Fig. 8 is a view partly in elevation and partly in vertical section of the photoelectric cell and the devices for illuminating the article to be operated on by the sorting machine showing the same in position on one of the carriers;

Fig. 9 is a section on the line 9—9 of Fig. 8 looking in the direction of the arrows, showing the screen against which the article to be sorted is pressed, when brought within range of the photoelectric cell;

Fig. 10 is a vertical sectional view taken on line 10—10 of Fig. 1 showing the hopper containing articles to be sorted, and the feeding mechanism associated therewith;

Fig. 11 is a section taken on line 11—11 of Fig. 10;

Figure 1:
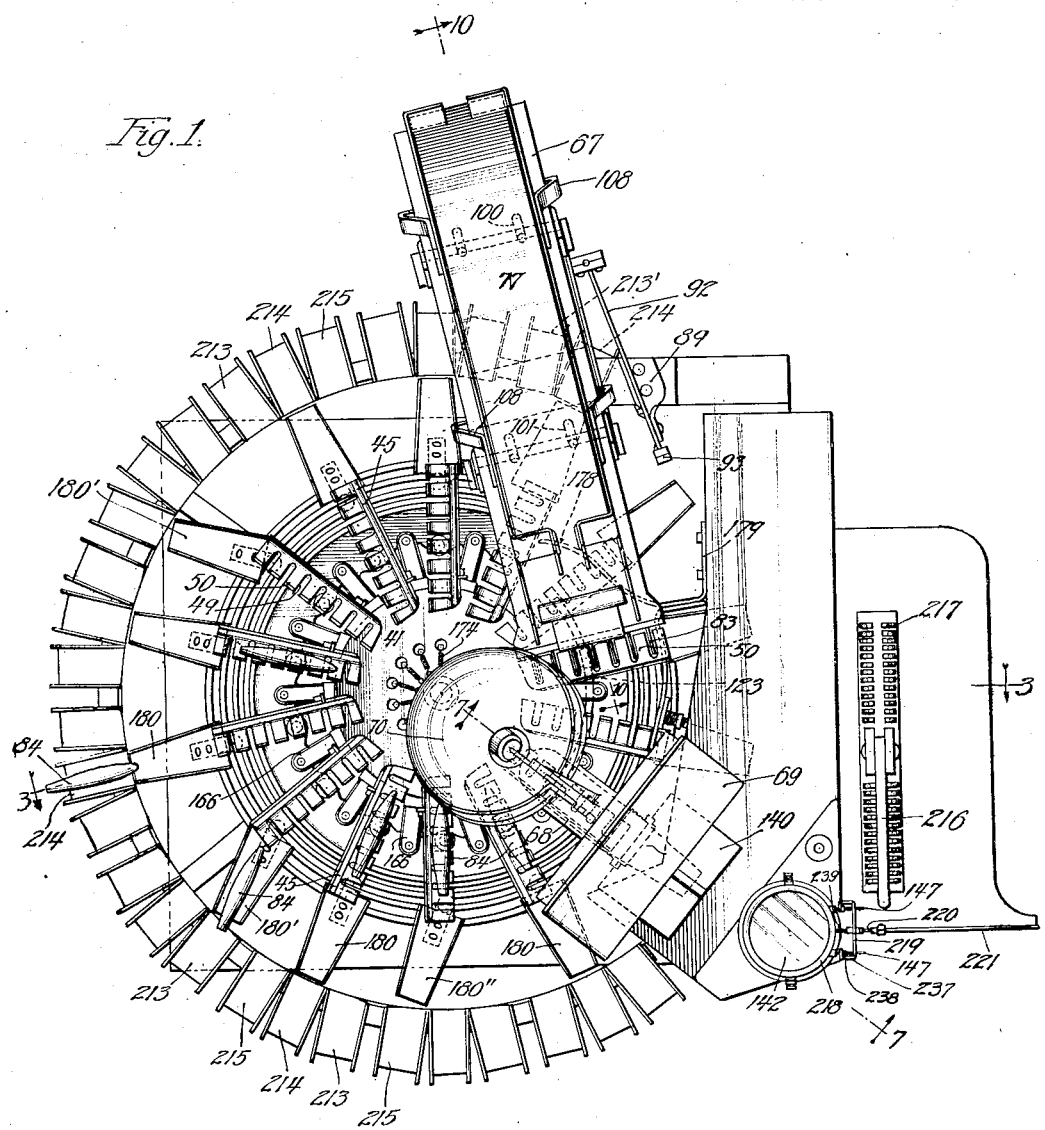
Figure 1 is a top plan view of the improved sorting machine embodied in this invention.
Figure 2:
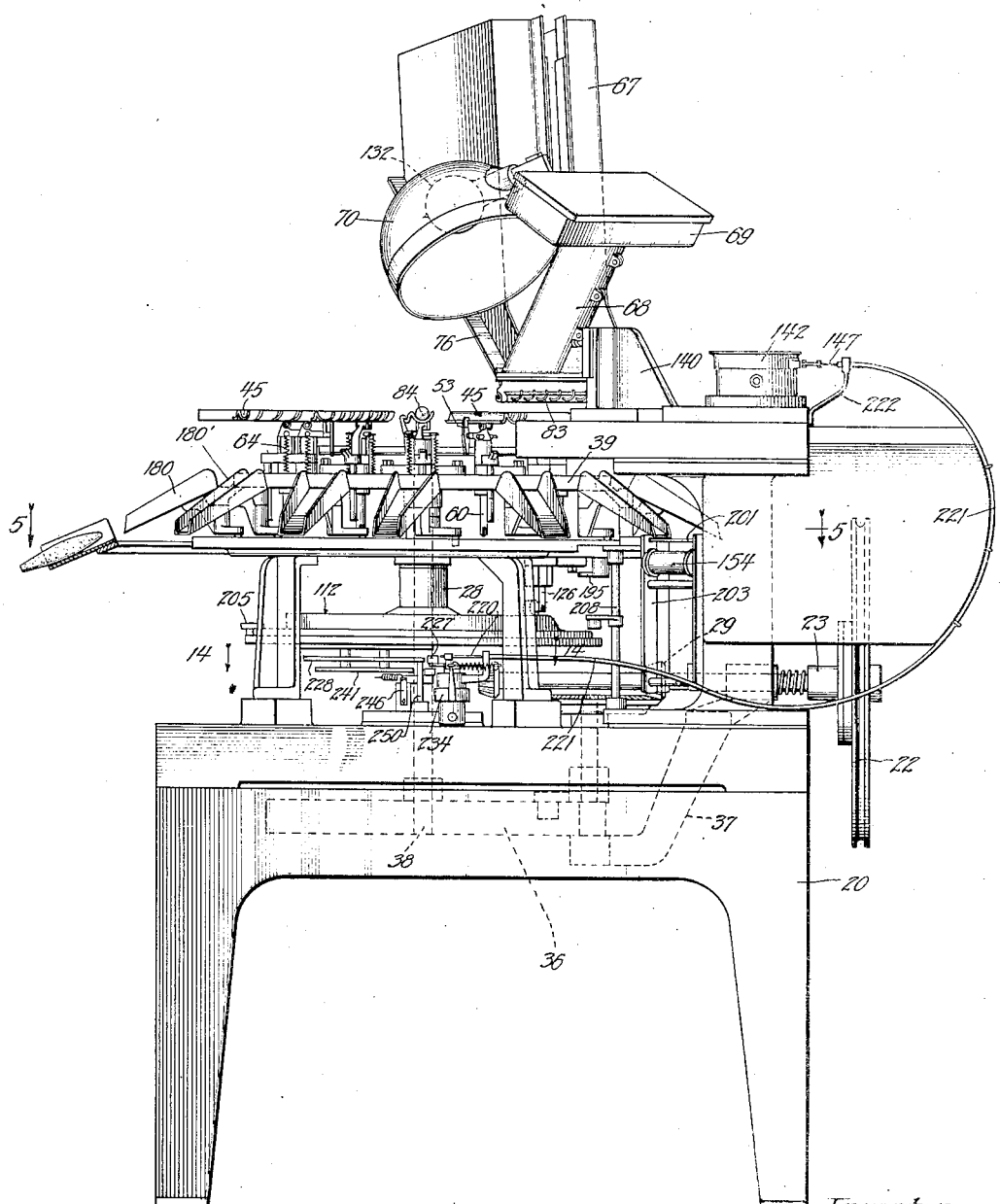
Fig. 2 is a front elevational view thereof.

Referring in detail to the drawings, the improved sorting machine is provided with a framework 20 upon which is suitably journaled the main drive shaft 21 which is connected with the driving pulley 22 by means of the clutch 23 of any suitable construction. Mounted on the shaft 21 is the beveled gear 24 that meshes with the beveled gear 25 which is provided with a sleeve-like extension or collar 26 to which is secured to turn therewith the cam carrying plate 27 which has a sleeve or collar 28 formed integral therewith. The shaft 21 also has keyed thereto, the beveled gear 29 which meshes with the beveled gear 30 carried by the shaft 31, the gears 24 and 29 and the gears 25 and 30 being of the same size. Keyed to the shaft 31 is an arm 32 provided with a roller 33 which is adapted to coöperate with the teeth 34 having the arcuate recesses 35 which are provided on the wheel 36 and with which coöperate the rollers 33, the wheel 36 moving, due to the arrangement of the parts, in a step-by-step movement and advancing the distance from one tooth to the next with every revolution of the shaft 31, thus providing what is known as a Geneva motion.

The shaft 31 is journaled at its lower end in a bracket 37 mounted on the framework 20. The star wheel 36 is keyed to the shaft 38 which is suitably journaled in the framework and which extends upwardly through the sleeve 26 and has mounted to turn therewith the plate or turntable 39 upon which is mounted to turn therewith a plurality of article carriers 40. The number of article carriers is preferably the same as the number of teeth in the large wheel of the Geneva motion or the star wheel, and it will be clear from the above that with each revolution of the cam carrying plate 27, the carriers will advance one step in their movement about the shaft 38 and that it will require as many steps to complete a single revolution of the carriers as there are carriers, there being the same number of teeth in the wheel 36 as there are carriers.

The upper end of the shaft 38 is journaled in the stationary plate 41 which is secured to the framework in any suitable manner.

Figure 3:
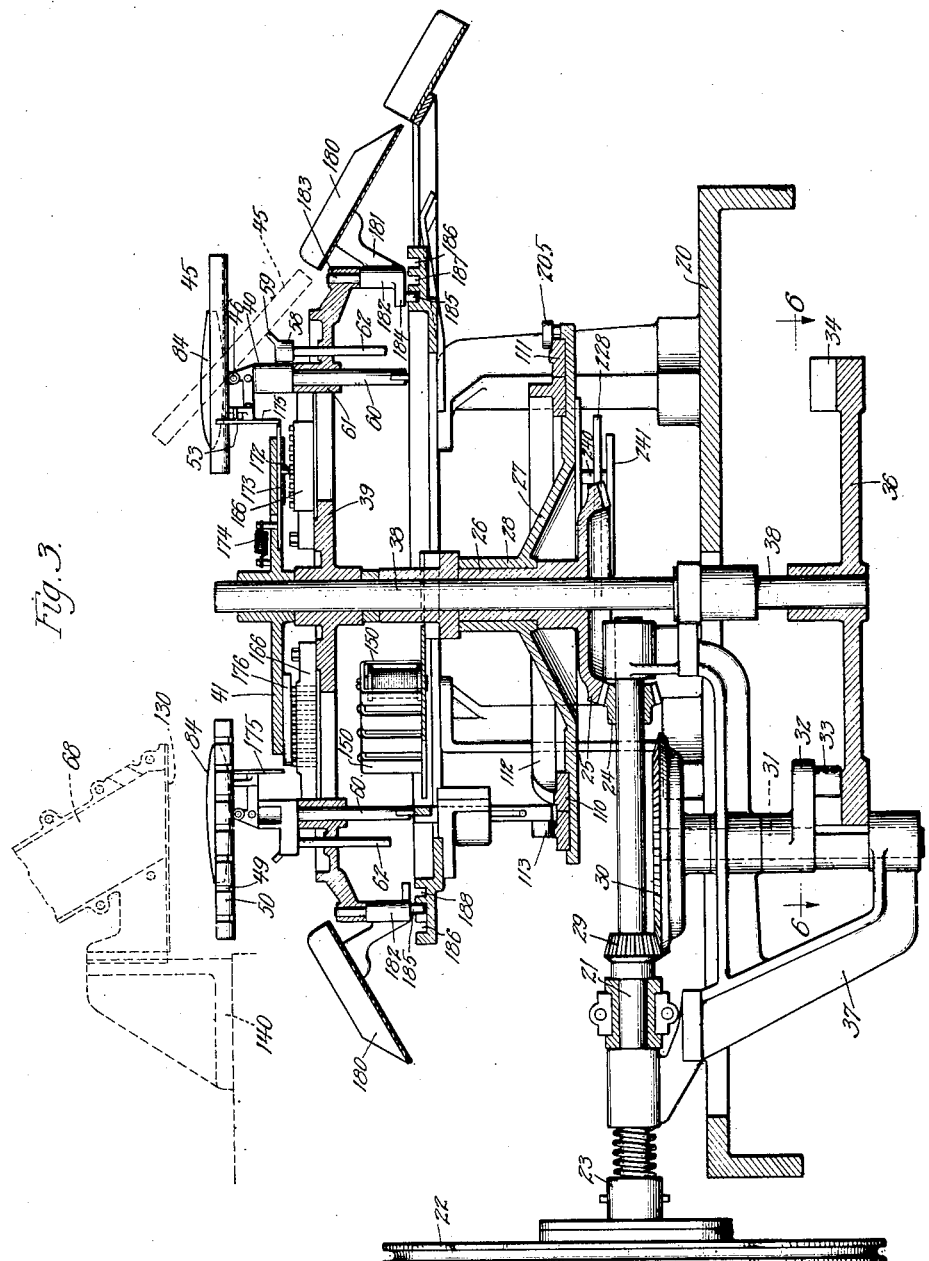
Fig. 3 is a section of the machine taken on the line 3—3 of Fig. 1.
Figure 13:
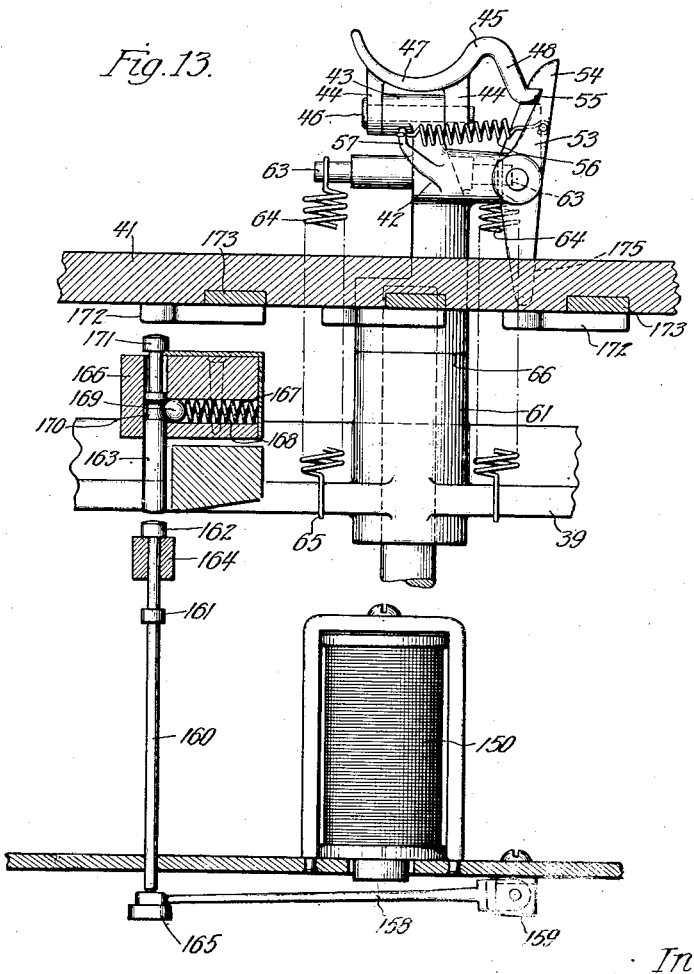
Fig. 13 is an enlarged section taken on the line 13—13 of Fig. 5.

Referring now to Figs. 3 and 13, it will be seen that each of the carriers comprises a main body portion 42 which is provided at the upper end thereof with a sleeve 43 which is adapted to coöperate with the ears 44 on the lower side of the article supporting member or holder 45 to pivot the holder 45 thereto by means of the pivot pin 46. The holder 45 is provided with a concave portion 47 in which the article to be carried is adapted to rest and with an extension 48, the purpose of which will be later explained.

Referring now to Figs. 1 and 8, it will be seen that the concave portions 47 of the holders 45 are provided with a plurality of slots 49 provided on the fingers 50 which extend rearwardly from the holders on the main body portion of the article carrier.

Referring now to Figs. 8 and 13, there is provided an extension 51 which has a finger 52 that acts as a stop to limit the pivoting of the holder 45 in one direction. It will be seen from Fig. 8 that the article carrier is overbalanced in that a larger portion of the material of the article holding member is to the right than to the left of the pivot. In order to hold the parts in the horizontal position shown in Fig. 8, the catch 53 is provided which is provided with a hook portion 54 which is adapted to engage with the lip or tongue portion 55 on the extension 48.

The catch 53 is pulled toward the left in Fig. 13 by means of the spring 56 which is secured to an arm 57 provided on the main body portion 42 of the article carrier. It will be seen that when the catch 53 is released that the article carrier will dump or discharge the contents thereof to the right as shown in Fig. 8, the position of the article carrier when dumped being shown in dotted lines in Fig. 3.

The main body portion 40 of each of the carriers is provided with a boss or projection 58 having a stop 59 against which the article holder is adapted to rest when in the dotted position shown in Fig. 3. The carrier is also provided with a downwardly extending rod-like portion 60 which is slidably mounted in a sleeve-like portion 61 of the wheel or plate 39 and with an additional guide rod 62 that is adapted to slide through an opening in the plate 39 to prevent turning of the carriers on the plate. Each of the carriers is also provided with a pair of ears 63 to which are adapted to be connected the coil springs 64 which are secured to the plate 39 at the other end thereof as at 65. These springs tend to pull the carrier downwardly so that the shoulder at 66 will engage with the upper end of the sleeve 61.

As the article carriers move in the step-by-step movement around the machine described above, they pass first under the hopper 67 from which they receive an article and then they pass under the selecting device comprising a tubular member 68 at the upper end of which is mounted the photoelectric cell 69 which is provided with the illuminating device 70. After passing under the selecting device, the article carrier moves to a plurality of stations, there being ten in the present machine, by a step-by-step movement, moving from one of said stations to the next at each step. The articles from the hopper are delivered to the carriers in the following manner: the hopper 67 is provided with straight side walls 71, one of which is provided with a slide 72 which is adjustably mounted at 73 to provide an outlet or mouth 74 for the hopper of varying sizes so that the same can be adjusted to the size of the article handled thereby. Adjacent this opening is provided a guide member 75 to aid in guiding the articles to the opening and preventing the weight of the articles above the opening from clogging the same. The bottom 76 of the hopper 67 is preferably made sloping as shown in Fig. 10 and slidably mounted on this sliding or sloping bottom is the false bottom or slide 77. The sloping bottom 76 is provided with an extension 78 that extends slightly beyond the end of the slide 77 and extends at a slightly different angle than the rest of the bottom 76. This extending portion of the bottom is provided with side members 79, thus forming a chute or spout. The spout is provided with a guide or guard member 80 having a curved upper end portion 81 and a sloping lower portion 82 that extends substantially parallel to the bottom of the hopper and provides a guide of such a height that only one of the articles can be fed through the same at a time.

The extreme end portion of the extension 78 has secured thereto, a plurality of fingers 83 as will be clear from Figs. 1 and 10. The spaces between the fingers 83 are wide enough to receive the fingers 50 of the article carriers and the slots 49 of the article carriers are of sufficient width for the fingers 83 to pass therethrough. It will be seen from the above that if the article carrier is in the position shown in Fig. 10 and then is raised slightly above the position shown for the central member in Fig. 12, that the article carrier will pass through the fingers 83 so as to receive an article such as a cigar 84 held thereby which will then rest in the recess 47 in the article carrier and will be carried around the machine by the same, another of the articles immediately moving into place on the fingers.

In order that the articles in the hopper will all enter the guide way and spout portion of the hopper in the same position and in order to prevent clogging of the outlet of the hopper, the slide or false bottom 77 is reciprocated rapidly or vibrated in a direction parallel to the length of the bottom of the hopper. This reciprocating or vibratory movement is obtained by the following structure: An eccentric 85 is mounted on the main drive shaft 21 and is provided with the eccentric strap 86 which has pivoted thereto, the arm or rod 87 which is secured to the lever 88 which is pivoted to a bracket 89 carried by the framework at 90. The rod 87 and lever 88 are connected by means of a universal joint 91. The end of the lever 88 opposite the rod 87 has connected thereto, the rod 92 by means of the universal joint 93. The rod 92 is pivoted at 94 to a rod 95 that connects the members 96 and 97 carrying the pins 98 and 99 that are riveted to the slide 77 and operate in the slots 100 an 101 in the bottom 76 of the hopper. The pins 98 and 99 are secured to cross members 102 and 103 which are provided with upwardly extending members 104 and 105 pivotally mounted on the straps 106 and 107 respectively which are secured to the bottom of the hopper 76.

Referring to Figs. 10 and 11, it will be seen that the bottom of the hopper is connected to the sides thereof by means of the straps 108 and that the left end of the hopper, as shown in Fig. 10, is provided with a slotted portion at 109. It will be seen that as the shaft 21 rotates, the eccentric will produce a short oscillating or vibratory movement of the rod 87 which is transmitted through the lever 88 and vibrates the rods 92 and 95 and the cross members carrying the pins 98 and 99 and thus produces a short oscillation or vibration of the false bottom or slide 77.

The cam carrying plate 27 is provided with a pair of circular cams 110 and 111. The cam 110 is provided with a vertically upwardly extending high or raised portion 112 and the cam 111 is provided with a high portion 113.

Figure 5:
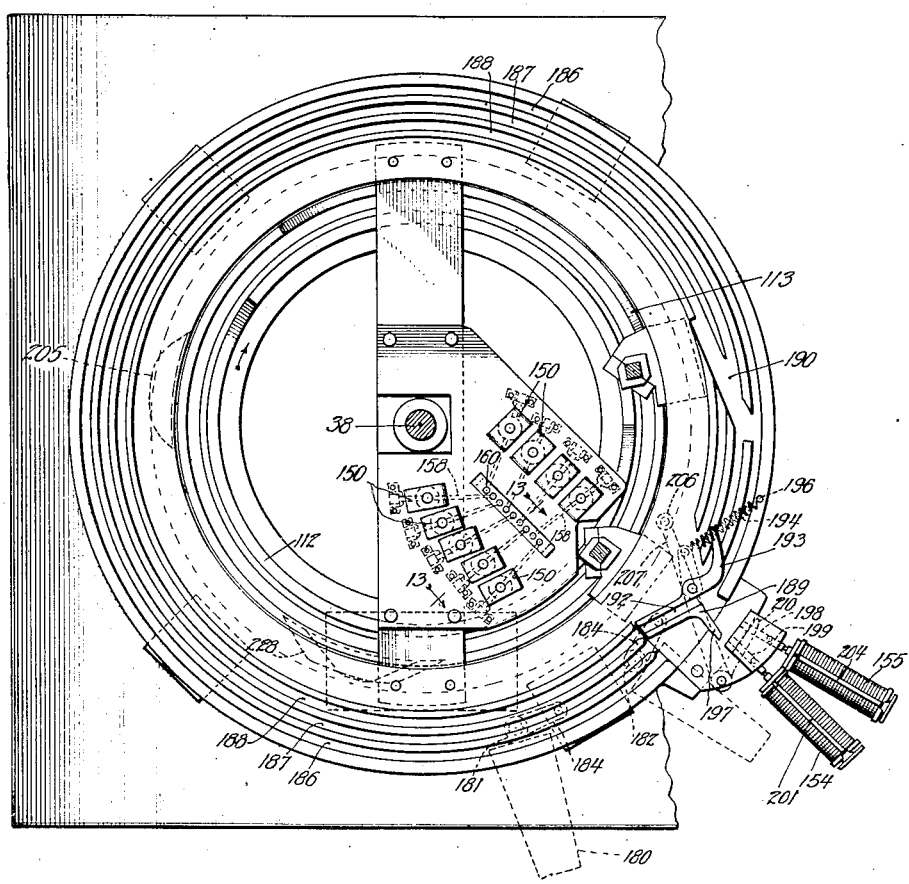
Fig. 5 is a section taken on the line 5—5 of Fig. 2 showing the parallel annular tracks for guiding the cigar carriers into different angular positions, and the switching mechanism coöperating therewith.

Referring to Fig. 5, it will be seen that the raised portion of the cam 112 extends slightly over half way around the cam carrying plate and the raised portion 113 of the cam 111 extends slightly less than half way around the same.

The cam portion 113 is adapted to cooperate with the roller 114 on the plunger 115 which is mounted to slide vertically in the framework at 116 and is provided with the springs 117 on the brackets 118 and on the bracket 119 and the track portion 120 so as to normally draw the roller 114 downwardly against the upper surface of the cam 111. The upper end of the plunger 115 is provided with the inclined track portion 120 having a short flat portion 121, the track being adapted to coöperate with the roller 122 on the end of the depending portion 60 of the article carrier 40 so that as the article carrier moves from left to right in Fig. 12, it will assume the position shown in Fig. 12 at the left thereof as the roller rides up the inclined portion and across the straight portion of the track. As the member 40 moves forward in a step-by-step movement, it will remain stationary in this position for a short period during which time the raised portion 113 of the cam 111 will engage with the roller 114 to raise the plunger carrying the track and the article carrier 40 will be carried upwardly with the same and the fingers thereon will pass between the fingers 83 on the hopper and a cigar or other article will be deposited on the carrier and will be carried around with the same as the carrier 40 again moves forwardly to the right as shown in Fig. 12.

A track having a level portion 123 and an inclined portion 124 and a lower level portion 125 is provided adjacent the plunger 115 so that the roller 122 will ride along the same and the article carrier will gradually move downwardly to substantially its normal position so that the same will pass under the bottom of the selecting device. From the portion 125 of the track, the roller on the carrier will engage with the track portion provided on the plunger 126 which has the level portion 127 and the inclined portions 128. When the article carriers 40 reach the position shown at the right of Fig. 12 in their travel around the machine, they will remain stationary at this point for a short period, due to the step-by-step movement of the same and while they are in this position, the raised portion 112 of the cam 110 will engage with the roller 129 on the lower end of the plunger 126 and raise the same. At this point, the article carriers are directly below the selecting device and when they are moved upwardly by the cam 110 as just described, they will assume the position shown in Fig. 8.

It is, of course, understood that the plunger 126 is slidably mounted in the framework in a manner similar to the plunger 115 and is provided with springs to draw the same downwardly so as to obtain the proper engagement between the cam and roller in a manner similar to that of the plunger 115.

Figure 12:
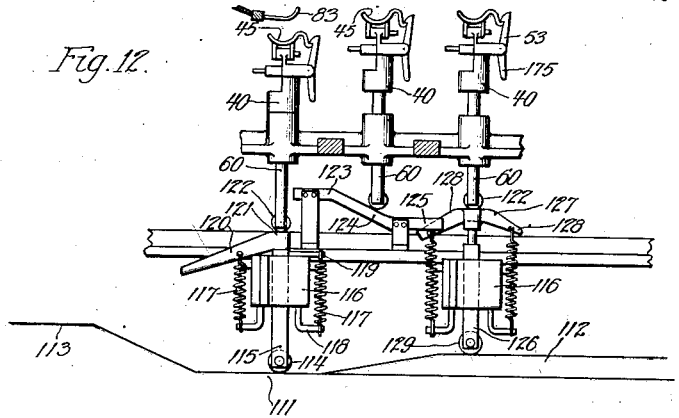
Fig. 12 is a vertical sectional view of the article carrier shown in Fig. 11, and the article carriers immediately to the right thereof, and associated parts.

Referring now to Fig. 8, it will be seen that when the plunger is raised as shown in Fig. 12, that the article 84 will be moved so as to come into engagement with the selecting device and also pressed against the screen 130 which is provided with a plurality of longitudinal openings or slots 131. When the article 84 is in this position, it is illuminated by the lamp 132 which is mounted in the elliptical reflector 133 having its filament substantially at one of the focal points of the ellipse. The other focal point of the ellipse is located substantially at 135 at the point where the surface of the article 84 engages with the screen 130. The opening provided in the screen 130 is of less length and breadth than the articles to be sorted so as to present the same area of each of the articles to the selecting device. By locating the light at one of the focal points of an elliptical reflector and the object to be illuminated at the other focal point thereof, the light is so concentrated that practically all of the light obtained from the lamp 132 will pass through the opening 136 in the tubular member 68 and will be concentrated on the article 84. This light will then be reflected upwardly in the tube 68 and will affect the photoelectric cell 69 which is exposed at the lower side thereof to the interior of the tube 68.

The reflector 133 is carried on a clamping member 137 mounted on the adjustable bracket 138 that has an arm 139 carrying the lamp 132, all of these parts being suitably mounted on the framework at 140. After the article has been exposed to the light to affect the cell 69 for the proper length of time which is determined by the length of the high portion of the cam 110, the article carrier will again drop to its normal position which takes place just after the cam passes the position shown in Fig. 12.

When the article is exposed to the light and coöperates with the photoelectric cell to affect the same, the effect produced on the cell is transmitted through suitable amplifying devices to the pointer or needle 141 of the measuring instrument 142 forming part of the selector mechanism. The end 143 of the needle 141 operates between the two sets of contacts, one set of which 144 is fixed and the other set of which 145 is mounted on a movable contact making member 146 slidably mounted in any suitable manner by means of the pins 147. The pointer 141 will assume numerous angular positions depending upon the effect produced on the photoelectric cell by the article moving into coöperating relation therewith and will travel from the uppermost contact point shown in Fig. 16 to the lowermost contact point shown therein as the intensity of the light increases, due to the differences in color in the article exposed to the light, the lightly colored articles, of course, reflecting the greatest amount of light. The measuring device and the amplifying device located between the photoelectric cell and the measuring device, can be so adjusted that any desired range of color can be obtained and so that the needle 141 will be positioned adjacent a different contact for each difference in shade of the articles presented to the selecting device, the change to a lighter shade taking place step-by-step as the needle moves clockwise.

Figure 16:
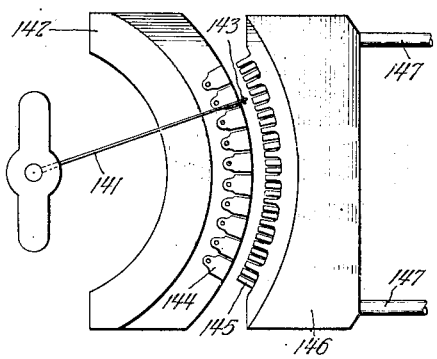
Fig. 16 is a plan view of the selecting device used to set the sorting mechanism.
Figure 17:
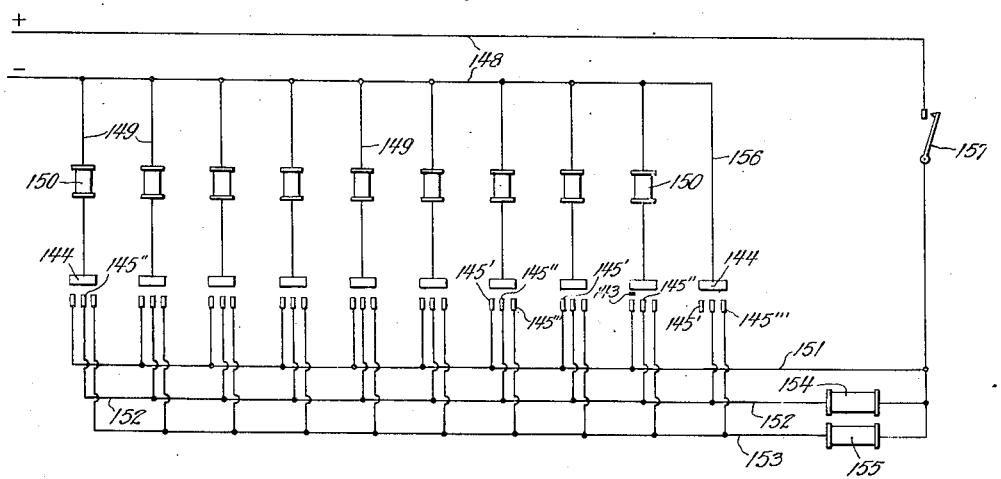
Fig. 17 is a diagram of the circuit for operating the mechanism for setting the sorting devices through the agency of the selecting device.

Referring to Figs. 16 and 17, it will be seen that each of the contacts 144 is located opposite a plurality, preferably three, contacts 145. In order to distinguish between the three contacts, these are designated in Fig. 17 as 145', 145" and 145'''. The member 143 on the needle 141 completes the circuit between one of the contacts 144 and one of the contacts 145 whenever the movable contact member 146 is moved to the position adjacent the contacts 144, the member 143 then being squeezed between the two contacts.

This selecting device is used to operate suitable mechanism by means of an electric current obtained from the line 148 having the branches 149, each of which has in series therewith the coil 150 of an electromagnet for operating suitable devices which are to be described subsequently and these line wires 148 are also provided with branches 151, 152, and 153 which, as will be seen from Fig. 17, are connected as follows: the wire 151 is connected with each of the contacts 145'; the wire 152 is connected with each of the contacts 145"; and the wire 153 is connected with each of the contacts 145'''.

In series with the wire 152 is the coil 154 of an electromagnet, the purpose of which will be later described, and in circuit with the wire 153 is the coil 155 of an electromagnet which will be later described. The branch 156 leading from the line wire 148 is not provided with a coil 150 as are the wires 149, and the contact 145' of the set corresponding to this wire is not connected with the wire 151 as it is not desirable to complete the circuit through this contact in the device as constructed. The circuit is provided with any suitable switch 157 by means of which it can be opened and closed.

It will be seen from the showing in Figs. 16 and 17 that when the member 143 is in the position shown, it will complete the circuit through the last coil 150 to the right in Fig. 17 and that the circuit will be completed through the contact 145' and the wire 151, thus operating the device controlled by the electromagnet associated with the coil 150.

In a similar manner, if the member 143 were between the contact 144 and the contact 145" of the last member to the left shown in Fig. 17, the circuit would be completed through the contact 145" and the wire 152, thus placing the farthest coil 150 to the left in Fig. 17 and the coil 154 into operation.

In the device illustrated, there are ten contacts 144 and thirty contacts 145. It will thus be seen that thirty different selections can be obtained by the arrangement described as thirty different circuits can be obtained in Fig. 17 depending upon the position of the needle or pointer 141. By grouping the contacts, a much smaller number of solenoids 150, 154 and 155 are needed than if single contacts were used.

Referring now to Fig. 13, one of the solenoids 150 is shown therein as being mounted on the framework of the machine in any suitable manner and as coöperating with an armature 158 pivoted to the framework at 159. When the coil 150 is energized by being thrown into the operating circuit by the needle 141 assuming the position opposite the contact 144 associated with this coil, the armature 158 is drawn upwardly and moves the operating rod 160 provided with a collar 161 and a head 162 upwardly against the pin 163. The rod 160 is slidable in a portion of the framework at 164 and is limited in its upward movement by the collar 161 and in its downward movement by the head 162 and the stop 165.

Each of the solenoids 150 operates one of the pins 163 and each pin 163 associated with each carrier 45 controls a definite dumping or discharge station for the article carrier 40. There is one less pin and one less solenoid than there are different dumping stations for the carriers, the last station being positively operating and not being controlled by the pins just referred to.

The pins are mounted in castings 166, there being a casting associated with each of the article carriers 40. The castings 166 are located slightly in advance of the article carriers and are each provided in the present instance with nine pins 163, these pins being arranged in a row that extends radially of the machine. The castings 166 are secured to the turntable or rotating member 39 as will be clear from Fig. 3 and rotate with the carriers 40.

In the castings 166 are provided bores 167 in which are seated, coil springs 168 and balls 169 adapted to engage grooves 170 in the pins 163 to hold them in their retracted position. The pins 163 are provided with heads 171 that are adapted to engage with the cams 172 provided on the slidable plates or catch actuating rods 173 which are mounted in slots in the stationary plate 41 and are normally held in retracted position by the springs 174. When a pin 163 engages with a cam 172, it forces the member 173 radially outward and into the path of movement of the lower end 175 of the catch 53 and swings the same clockwise as shown in Figs. 12 and 13, so as to disengage the hook 54 from the lip 55 whereupon the carrier assumes the dotted position shown in Fig. 3 and discharges the article carried thereby.

As each of the solenoids 150 controls the operation of one of the pins 163 of each set and as there is a set of pins for each article carrier, the article that is moved into coöperating position with the selecting device, will operate the indicating instrument so as to move the needle into such a position that contact will be made between the proper contacts to operate the solenoid 150 that corresponds to the color of the article which will in turn set or project the pin 163 carried by the casting 166 associated with that particular article carrier and this pin will, as it travels around with the article carrier, come into contact with one of the cams 172, the cams being arranged in radially stepped arrangement corresponding to the radial positions of the pins and this will operate the particular member 173 carrying the cam that is engaged by the pin that has been projected when reaching a certain definite location in its travel around the machine at which point the article will be discharged by the dumping of the carrier to the position shown in Fig. 3.

In order to return the pins 163 to their normal position, a suitable cam 176 is provided on the stationary plate 41 that will press the pins that may be projecting downwardly so that the ball 169 will be seated in the socket 170.

The last or tenth catch tripping member 177 is fixedly mounted on the plate 41 by means of screws or other fastening means 178. The member 177 is also in projected position and will engage the catch 53 to positively dump all the article carriers that have not been dumped by one of the other tripping members 173. When the selector operates to dump the articles at the discharge station controlled by the tripping member 177, the current passes through the wire 156 and contacts associated therewith, there being no solenoid 156 in the circuit. After the article holders 45 have passed the member 177, they will all be in their discharge positions. In order to have them receive articles from the fingers 83 and hold the same, they must be returned to their normal article carrying position. In order to restore the article holders to a horizontal position the cam 178 is mounted on the framework at 179. The cam is adapted to engage the under side of the article holders 45, radially outwardly of the pivot point thereof, and is sloped upwardly so as to gradually raise the holders to horizontal position, when the catches 53 will engage the lips 55 to hold the article holders in horizontal position. After the article holder has reached this position, it receives another cigar or other article from the hopper and repeats its travel as above described.

The above described structure only provides for ten selections, and in order to multiply these, the spouts or chutes 180 are provided, one of these being located opposite each of the article carriers. The spouts or chutes 180 are each mounted on a bracket 181 provided on the member 182, swiveled at 183 in the turntable 39. The member 182 is also provided with an arm 184 extending at right angles to the bracket 181 having a downwardly extending lug 185 which is adapted to travel in any one of the plurality of grooved annular tracks 186, 187 and 188. When the lug 185 is in the track 187, the chute or spout 180 will be extending in a radial direction, when the lug 185 is in the track 186 the spout will be turned in an angular position to the right of the radial position and when the lug 185 is in the track 188 the spout will be turned in an angular position to the left of the radial position. The position of the lug 185 in the tracks is determined by the selecting mechanism through the agency of the plurality of contacts 145 coöperating with each contact 144.

The selecting device operates the switching mechanism 189, whereby the member 185 is guided into the track selected thereby. As the guide lug 185 moves along the tracks 187 or 188 it reaches the cross over 190, whereby it is guided into the outer track 186, so that the guide lugs will always be traveling along the outer track 186 when they reach the switching device 189. The switching device is pivoted at 191 and is provided with a guide 192 for the lug 185 and with a cam portion 193 adapted to project across the track 186 so that the lug 185 in moving along the track will engage with the same and throw the switching device 189 around in a counter-clockwise direction against the tension of the springs 194 secured to an ear 195 on said switching device and to the under side of the track at 196, to a position so that the guide 192 would open into the outer track 186. The switching device is provided with a projecting finger 197 adapted to coöperate with the stop pins 198 and 199, the operation of which is controlled by the selecting device, to guide the lug 185 into the tracks 186 and 187 respectively. When neither stop pin is actuated to engage the finger 197, the switch will be drawn into the position shown in Fig. 5 by the spring 195 and the lug 185 will be guided into the track 188. Each of the stop pins has associated therewith a solenoid, the solenoid 154 being associated with the stop pin 199 and the solenoid 155 being associated with the stop pin 198.

Referring now to Fig. 7, it will be seen that the solenoid 154 has associated therewith the armature 200, having the plunger 201 secured thereto, which engages the stop pin 199. The plunger is provided with a stop 202 to limit the return movement thereof, and the entire operating mechanism for the stop pin is mounted on the framework 203, secured to the main framework of the machine. The stop pin 198 is provided with similar actuating mechanism associated with the solenoid 155, the plunger associated therewith being shown at 204.

Suitable mechanism is provided for returning the stop pins and plungers to retracted position, comprising a cam 205 mounted on the turntable 39 which is adapted to engage with a roller 206 provided on the arm 207, keyed to shaft 208 at 209 to which is keyed the arm 210 adapted to engage with the downwardly projecting pins 211 on the stop pins 198 and 199. The cam 205 moves the arm 207 clockwise as shown in Fig. 5 and carries the arm 210 with it in the same direction thus moving the stop pin and associated plunger to the right, (Fig 7). Any suitable means such as a spring 212 is provided to return the roller carrying arm to retracted position.

Figures 4, 6:
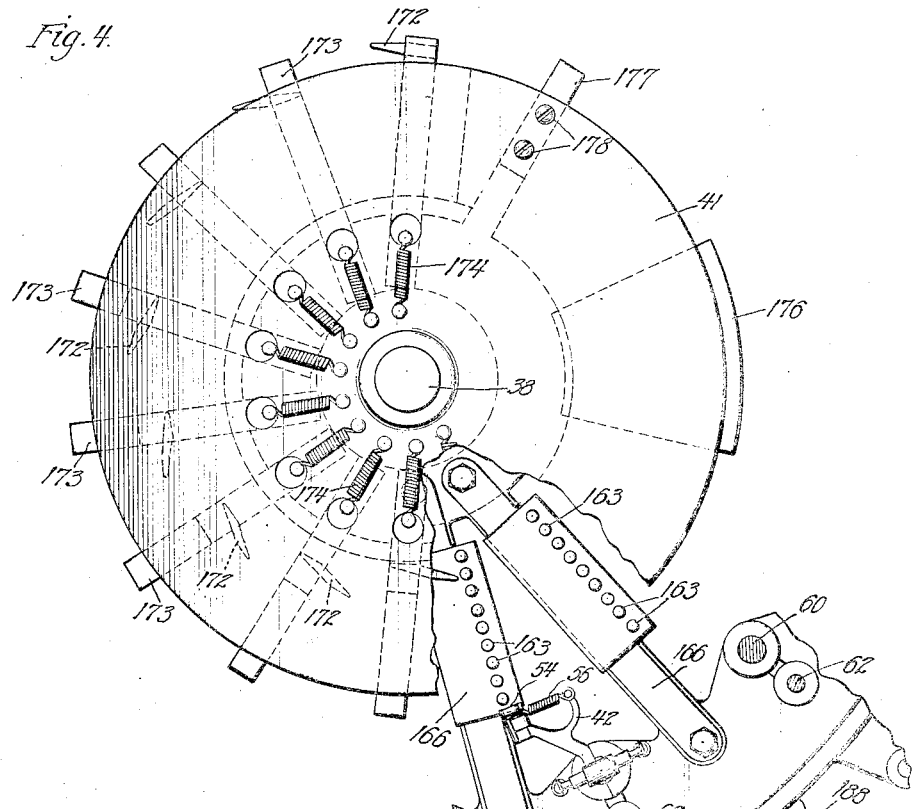
Fig. 4 is a plan view, partly broken away, of the stationary cam carrying plate and associated parts, showing certain of the rotating cam operating members carried by the turntable of the machine and the selector controlled means for setting said cam operating devices in plan view.
Fig. 6 is a section taken on line 6—6 of Fig. 3 showing the Geneva motion or star wheel whereby the turntable upon which the article carriers are mounted is advanced the distance from one carrier to the next to provide a step-by-step motion thereof.

It will be seen from the above that when the needle 141 is in such a position as to complete the circuit through one of the contacts 145' that neither of the solenoids 154 and 155 will be energized and the spring will throw the switch 189 to the position shown in Fig. 5, which will cause the lug 185 to follow the track 188 and cause the spout associated therewith to assume an angular position to the right of the radial, looking toward the center of the machine, as at 180'. Fixed to the framework of the machine is a series of chutes arranged in groups of three, and each emptying into a separate receptacle (not shown). Each group comprises a chute 213 inclined to the right of the radial position, a radially extending chute 214 and a chute 215 inclined to the left of the radial position. When the spout is in the position 180' the article 84 carried thereby will be discharged into one of the chutes 213. When the needle is in such position that the circuit is completed through one of the contacts 145" then the solenoid 154 will be energized, which will operate stop pin 199 and switch 189 will assume such a position as to guide the lug 185 into the central track 187, and the spout will assume a radial position as shown in Figs. 4 and 5 and as shown at 180 in Fig. 1. When the spout is in this position it will discharge the article 84 into one of the chutes 214. When the needle is in such position that the circuit is completed through one of the contacts 145''' then the solenoid 155 is energized operating stop pin 199, and switch 189 will be held in such position as to guide lug 185 into the outer track 186 and the spout 180 will assume a position to the left of the radial as shown at 180'' in Fig. 1 and the article 84 carried thereby will be discharged into one of the chutes 215.

It will thus be seen that by means of the selecting device and the switching mechanism just described, the articles will be discharged at successively arranged positions and into chutes arranged in succession at each such position, in accordance with the position of the pointer or needle of the selecting device and in accordance with the color of the articles, the change in color taking place step-by-step for each chute around the machine, thus sorting the articles according to color.

At the fixed tripping member 177 any one of the article carriers will be dumped that carries an article that is out of the range of the selecting device or which falls within the range of selections effecting the contact 144 connected with the wire 156, and when the needle 141 is in such position as to direct the current either through the contacts 145'' or 145''' associated therewith, the solenoids 154 or 155 will be energized respectively and the spout 180 will assume such a position as to discharge the articles into either the last chute 214 or the last chute 215. However, if the article carried by said carrier is not within the range of the selecting device, the spout will assume such position as to discharge the article through the chute 213', due to the fact that the springs 196 will move the switch so as to guide the lug 185 into the innermost track and due to the fact that no solenoid 150 is energized thereby. Thus the discharge of all articles from the machine is assured before the carriers again reach the article receiving position and, with the structure shown, twenty-nine different selections of articles can be obtained, thus sorting the same into twenty-nine grades.

The various electrical connections that are necessary in order to operate the device are made by the switch 216 having a plurality of contacts 217. In order to prevent an arc at the point where the member 143 on the end of the needle 141 engages with the contacts 144 and 145, the machine is provided with mechanism whereby the contact carrying member 146 is moved into position so as to squeeze the member 143 between the contact 145 and the contact 144 while the circuit is still open and then closing the circuit and reopening the same before moving the contact carrying member 146 away from the contacts 144. The rods 147 are slidably mounted in the framework 218 of the selecting device 142 and mounted on the rods is the member 219 to which is connected the end of a flexible member such as a wire 220 which extends through a flexible tubular casing 221 which is secured to a bracket 222 near the selecting device. The wire 220 has its opposite end portion secured to a bracket or arm 223 on the lever 224 by means of a set screw 225. The lever 224 is pivoted to the framework in any suitable manner as at 226 and is provided with a roller at 227 that coöperates with the cam 228. On the end opposite the roller 227 is provided an extension 229 having a hook portion 230 which has a spring 231 hooked thereto and a hook 232 on the arm 233 which is rigid with the sleeve 234 mounted on the framework of the machine and which has secured thereto, the bracket 235 provided with a guide 236 at the end thereof for the flexible member or wire 220. The spring 231 is a tension spring and tends to pull the lever 224 in such a direction that the roller 227 is pressed into engagement with the cam 228. When the cam 228 engages with the roller 227, the arm 223 will be moved toward the right or counter-clockwise in Fig. 14 and Fig. 15 and the end portion thereof at the selecting device will be moved toward the left, referring now to Fig. 1, which will move the member 219 toward the left along the pins 147 and will move the pins and the contacts carried thereby in the same direction after the spring 237 has been compressed sufficiently against the lug 238 carried by the pin 147 to move said pins.

The wire 220 is aided in its return movement by the spring 237 and the spring 239 and by the spring 231 on the operating lever 224. The cam 228 is mounted on the cam carrying plate 27 as will be clear from Fig. 3, and is secured thereto by means of the pins 240. The pins 240 also secure a cam 241 to the cam carrying plate and it will be clear from Fig. 14 that the cam 228 is longer and extends farther in both directions from the highest point thereof and has a longer high portion than the cam 241. The cam 241 is adapted to engage with a roller 242 mounted on the end of the lever 243 which is pivoted at 244 to the block 245 on the framework which carries an arm 246 to which is secured the spring 247 that is secured at its other end to the end portion 248 of the lever 243 opposite the roller 242.

Mounted on the block 249 on the framework is an upright 250 which is provided with a contact screw 251 and a terminal 252 to which a wire 253 is adapted to be secured, the contact screw and terminal being insulated from the member 250. The block 249 is also provided with a contact member 254 having the wire 255 leading from the same which is suitably insulated from the lever 243 but secured to the same by means of the screw 256. The contact member 254 is provided with an upright portion 257 which has the contact 258 mounted thereon which is adapted to coöperate with the contact 251, the contact 251 being adjustable in the member 250. The wires 253 and 254 are one of the leads of the circuit shown in Fig. 17 diagrammatically and the contacts may be considered for the purpose of clearness, to be represented by the switch 157 in this circuit. When this switch is open, there would, of course, be no current flowing through the wires leading to the contacts 144 and 145 and through the member 143 on the needle of the selector. As the cam 228 is longer and has a high portion that engages with the roller 227 that is longer than the high portion of the cam 241 that engages with the roller 242, the lever 224 will be thrown around in a counterclockwise direction before the lever 243 is affected by the action of the cam. As the lever is thrown around, it will bring the contacts 145 into position against the member 143 on the needle and press this member between the contacts 144 and 145, thus making a good contact through the member 143 between the contacts 144 and 145.

After this movement has been completed, the cam 241 will engage with the roller 242 and throw the lever 243 in a clockwise direction and cause the contacts 251 and 258 to come into engagement, thus closing the circuit and operating the devices previously described as being operated by the solenods 150, 154 and 155.

Figure 14:
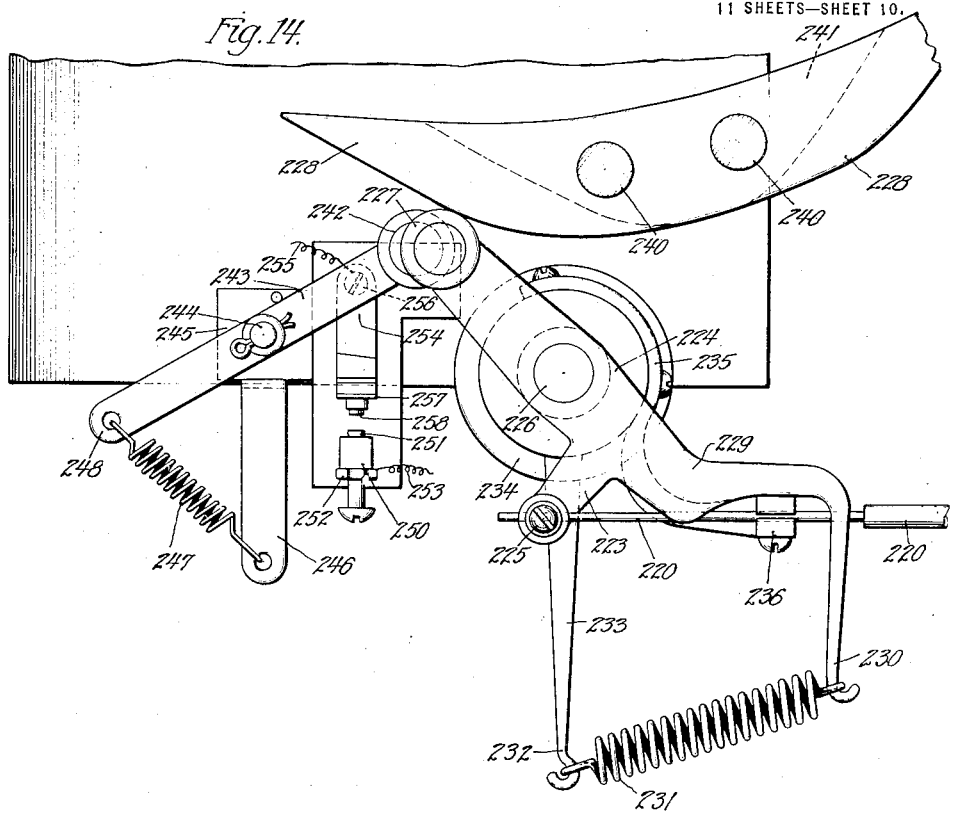
Fig. 14 is an enlarged section taken on line 14—14 of Fig. 2.
Figure 15:
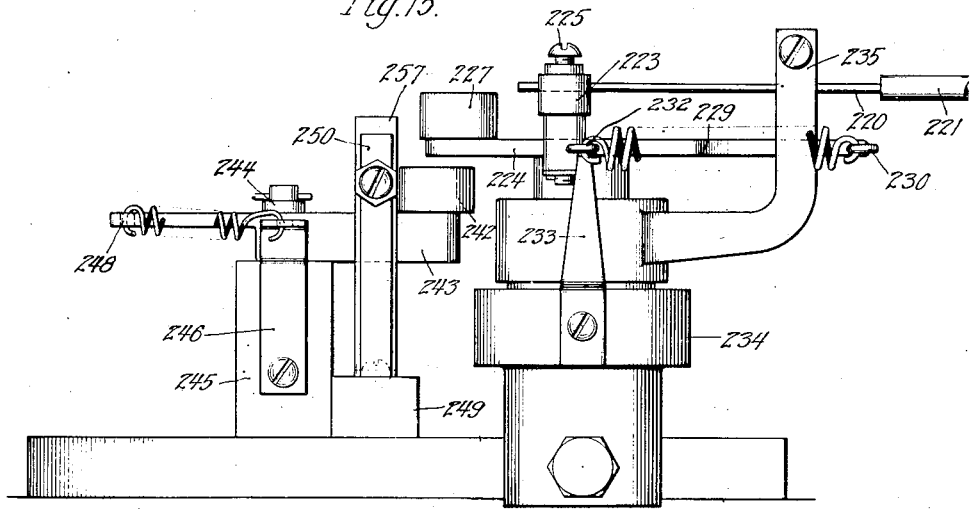
Fig. 15 is a side elevation of the circuit closing apparatus shown in Fig. 14.

The contacts 251 and 258 will remain closed for only a short period of time after which the spring 247 will move the parts into the position shown in Fig. 14, due to the fact that the cam 241 is no longer in engagement with the roller 242. The cam 228 will, however, still be in engagement with the roller 227 at this time and the contacts 144 and 145 will still be squeezing the member 143 between them.

After the roller 227 comes out of engagement with the cam 228, the spring 231 will retract the parts to move the wire 220 so as to separate the contacts 144 and 145 from the member 143. It will thus be seen that all possibility of sparking at the member 143 on the end of the needle 141 is removed.

The contact is made between the members 251 and 258 at the time when a cigar or other article is influencing the selecting device but sufficient time is allowed by the proper placing of the cams to permit the needle to come to rest at its proper reading before the contacts are closed, thus insuring an accurate selection by the instrument.

Having thus described my invention, what I desire to claim and secure by United States Letters Patent is:

1. In a machine of the character described, a plurality of article carriers, a device for selecting the articles on said carriage and means operated by said selecting device whereby said carriers will deposit said articles at predetermined points to sort said articles in accordance with the selection of said selecting device.

2. In a machine of the character described, a plurality of article carriers, means for selecting the articles on said carriers according to the color thereof, and means operated by said selecting means for sorting said articles according to color.

3. In a machine of the character described, a plurality of article carriers, means for automatically selecting the articles on said carriers according to the color thereof, and means operated by said selecting means for sorting said articles according to color.

4. In a machine of the character described, a plurality of article carriers, a selecting device, means for successively moving said carriers into the range of said selecting device and means for dumping said carriers at stations selected by said selecting device, to sort said articles.

5. In a machine of the character described, a plurality of article carriers, means for selecting the articles in accordance with the color thereof, means for successively moving said carriers into the range of said selecting means, and means for dumping said carriers at stations selected by said selecting means to sort said articles according to color.

6. In a machine of the character described, a plurality of article carriers, and means for selecting and sorting the articles whereby said articles on said carriers are deposited at predetermined points from said carriers in accordance with the color thereof.

7. In a machine of the character described, a plurality of article carriers, and electrically operated photometric selecting device, and means operated by said selecting device whereby said carriers will deposit said articles at predetermined points to sort said articles in accordance with the amount of light reflected from said articles.

8. A machine of the character described comprising a photo-electric cell, a selecting device electrically operated thereby, means for moving articles into the range of said cell to thereby operate said selecting device, means for moving said articles to a plurality of stations, and means controlled by said selecting device for depositing said articles at a selected station in accordance with the effect produced thereby on said cell.

9. A machine for sorting articles according to color into a plurality of groups comprising a photo-electric cell, a single selecting device operated thereby, means for moving articles into the range of said cell to thereby operate said selecting device in accordance with the color of said articles, means for moving said articles to a plurality of stations, and means controlled by said selecting device for depositing said articles at a selected station in accordance with the effect produced thereby on said cell and according to the color of the articles.

10. In a machine of the character described, a plurality of article carriers, a selecting device, means for moving said article carriers successively into position so that the articles carried thereby will operate said selecting device, means for tripping said carriers to dump said articles at a plurality of points, and means operated by said selecting device for operating any one of said tripping means to dump the article carried by a carrier at a selected point.

11. In a machine of the character described, a plurality of article carriers, a selecting device, means for moving said article carriers successively into position so that the articles carried thereby will operate said selecting device, means for tripping said carriers to dump said articles at a plurality of points, and means operated by said selecting device and associated with said article carriers for operating any one of said tripping means to dump the article carried by a carrier at a selected point.

12. In a machine of the character described, a plurality of article carriers, a selecting device, means for moving said article carriers successively into position so that the article carried thereby will operate said selecting device, means for tripping said carriers to dump said articles at a plurality of points, means operated by said selecting device for operating any one of said tripping means to dump the article carried by a carrier at a selected point, and means for returning said last mentioned means to inoperative position.

13. In a machine of the character described, a plurality of article carriers, a light-responsive selecting device operated by the articles on said carriers, and means operated by said selecting device whereby said carriers will deposit said articles at predetermined points to sort said articles in accordance with the selection of said selecting device.

14. In a machine of the character described, a selecting device, a plurality of article carriers, means for moving articles one at a time into the range of said selecting device and means for dumping said articles from said carriers at stations selected by said selecting device.

15. In a machine of the character described, a hopper adapted to contain a plurality of articles of different colors, a selecting device, means for moving said articles one at a time into the range of said selecting device, a plurality of article carriers, and means for dumping said carriers at stations selected by said selecting device to discharge said articles at said selected stations by the action of gravity.

16. In a machine of the character described, a selecting device, a plurality of article carriers, means for moving a plurality of articles one at a time into the range of said selecting device, means for tripping said article carriers to discharge the contents thereof, one of said tripping means being located at each of a plurality of discharge stations along the path of movement of said carriers and means selectively controlled by said selecting device for moving said tripping means into tripping position, whereby each of said carriers is tripped to discharge its contents at a selected station.

17. In a machine of the character described, a plurality of article carriers, means for holding said carriers in carrying position, a selecting device, means for moving said articles one at a time into the range of said selecting device, means for releasing said holding means to dump said carriers by the action of gravity located at a plurality of discharge stations along the path of movement of said carriers, means for moving any one of said releasing means to operative position and means controlled by said selecting device to set said last mentioned means so as to release the holding means at any station selected thereby.

18. In a machine of the character described, a plurality of article carriers, means for holding said carriers in carrying position, a selecting device, means for moving said articles one at a time into the range of said selecting device, means for releasing said holding means to dump said carriers located at a plurality of discharge stations along the path of movement of said carriers, means for moving any one of said releasing means to operative position, means controlled by said selecting device to set said last mentioned means so as to release the holding means at any station selected thereby, and means for returning said carriers to article carrying position.

19. In a machine of the character described, a plurality of article carriers, means for holding said carriers in carrying position, a selecting device, means for moving said articles one at a time into the range of said selecting device, means for releasing said holding means to dump said carriers, located at a plurality of discharge stations along the path of movement of said carriers, means for actuating said releasing means, said actuating means comprising a plurality of members each of which is adapted to coöperate with means on one of said releasing means to move the same to releasing position and means controlled by said selecting device to operate a selected one of said members so as to discharge the contents of said article carriers at stations selected by said selecting device, one of said actuating means being associated with each of said carriers.

20. In a machine of the character described, a plurality of article carriers, a selecting device, means whereby the same area of each article is exposed to the selecting device, and means operated by said selecting device whereby said carriers will deposit said articles at predetermined points to sort said articles in accordance with the selection of said selecting device.

21. In a machine of the character described, a plurality of article carriers, means for selecting said articles according to the color thereof, a member interposed between said selecting means and said article carriers whereby the same area of each article is exposed to the selecting means, and means operated by said selecting means for sorting said articles according to color.

22. In a machine of the character described, a plurality of article carriers, a selecting device, means operated by said selecting device whereby said carriers will deposit said articles at predetermined points to sort said articles in accordance with the selection of said selecting device, and means for discharging all articles out of the range of selections of said selecting device from said machine.

23. In a machine of the character described, a plurality of article carriers, means for selecting said articles according to the color thereof, means operated by said selecting means for sorting said articles according to color, and means for positively discharging all articles not falling within the range of selections of said selecting means from said machine.

24. In a machine of the character described, a cigar holding hopper, a plurality of cigar carriers arranged in a circular series and adapted to rotate about a common center in a step-by-step movement, means for feeding said cigars from said hopper to said carriers, a selecting device, and means operated by said selecting device, whereby said carriers are adapted to discharge the cigars therefrom at stations selected by said selecting device.

25. In a machine of the character described, a plurality of carriers each adapted to support an article thereon, means for feeding said articles to said carriers one at a time, said carriers being arranged in a circular series and being adapted to rotate about a common center in a step-by-step movement, a selecting device, means for moving said carriers into coöperative relation with said selecting device, said carriers being adapted to discharge the articles carried thereby at a plurality of stations along their path of movement, and means operated by said selecting device, whereby said carriers discharge said articles at the stations selected thereby.

26. In a machine of the character described, a plurality of carriers each adapted to support an article thereon, means for feeding said articles to said carriers one at a time, said carriers being arranged in a circular series and being adapted to rotate about a common center, a selecting device in juxta-position to said carriers, means for moving said carriers into coöperative relation with said selecting device, said carriers being adapted to discharge the articles carried thereby at a plurality of stations along their path of movement, and means operated by said selecting device, whereby said carriers discharge said articles at the stations selected thereby.

27. In a machine of the character described, a plurality of carriers each adapted to support an article thereon, means for feeding said articles to said carriers, said carriers being arranged in a circular series and being adapted to rotate about a common center in a step-by-step movement, a selecting device, means for moving said carriers into coöperative relation with said selecting device, said carriers being adapted to discharge the articles carried thereby at a plurality of stations along their path of movement, and means operated by said selecting device, whereby said carriers discharge said articles at the stations selected thereby.

28. In a machine of the character described, a plurality of carriers each adapted to support an article thereon, means for feeding said articles to said carriers, said carriers being arranged in a circular series and being adapted to rotate about a common center, a selecting device, means for moving said carriers into coöperative relation with said selecting device, said carriers being adapted to discharge the articles carried thereby at a plurality of stations along their path of movement, and means operated by said selecting device whereby said carriers discharge said articles at the stations selected thereby.

29. In a machine of the character described, a plurality of carriers each adapted to support an article thereon, means for feeding said articles to said carriers one at a time, said carriers being arranged in a circular series and being adapted to rotate about a common center in a step-by-step movement, a selecting device, said carriers being adapted to discharge the articles carried thereby at a plurality of stations along their path of movement, and means operated by said selecting device, whereby said carriers discharge said articles at the stations selected thereby.

30. In a machine of the character described, a plurality of carriers each adapted to support an article thereon, means for feeding said articles to said carriers, said carriers being arranged in a circular series and being adapted to rotate about a common center, a selecting device in juxtaposition to said carriers, said carriers being adapted to discharge the articles carried thereby at a plurality of stations along their path of movement, and means operated by said selecting device, whereby said carriers discharge said articles at the stations selected thereby.

31. In a machine of the character described, a plurality of article carriers, a selecting device, means for successively moving said carriers into the range of said selecting device, means for dumping said carriers at stations selected by said selecting device, to sort said articles, and means for returning said carriers to normal position.

32. In a machine of the character described, a plurality of carriers each adapted to support an article thereon, means for feeding said articles to said carriers one at a time, said carriers being arranged in a circular series and being adapted to rotate about a common center in a step-by-step movement, a light-responsive selecting device, means for driving said carriers into cooperative relation with said selecting device, said carriers being adapted to discharge the articles carried thereby at a plurality of stations along their path of movement, and means operated by said selecting device, whereby said carriers discharge said articles at the stations selected thereby according to the color thereof.

33. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means for moving said tripping means into operative position, said last mentioned means being controlled by said selecting device, whereby said carriers are tripped at a selected discharge station.

34. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means for moving said tripping means into operative position, one of said means being associated with each of said carriers, said last mentioned means being controlled by said selecting device, whereby said carriers are tripped at a selected discharge station.

35. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means selectively controlled by said selecting device for moving said tripping means into tripping position, whereby each of said carriers is tripped to discharge its contents at a selected station.

36. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position and means controlled by said selecting device to set said last mentioned means so as to release the holding means at any station selected thereby.

37. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, means controlled by said selecting device to set said last mentioned means so as to release the holding means at any station selected thereby, and means for returning said carriers to article carrying position.

38. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, said last mentioned means each comprising a plurality of members, each of which is adapted to operate one of said releasing means, and means controlled by said selecting device to set said last mentioned means so as to release the holding means at any station selected thereby.

39. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, said last mentioned means each comprising a plurality of members, each of which is adapted to coöperate with means on one of said releasing means to move the same to releasing position, and means controlled by said selecting device to operate a selected one of said members so as to discharge the contents of said article carriers at stations selected by said selecting device.

40. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for actuating said releasing means, said actuating means comprising a plurality of members each of which is adapted to coöperate with means on one of said releasing means to move the same to releasing position and means controlled by said selecting device to operate a selected one of said members so as to discharge the contents of said article carriers at stations selected by said selecting device, one of said actuating means being associated with each of said carriers.

41. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, said last mentioned means each comprising a plurality of members, each of which is adapted to coöperate with means on one of said releasing means to move the same to releasing position, means controlled by said selecting device to operate a selected one of said members so as to discharge the contents of said article carriers at stations selected by said selecting device, and means for returning said carriers to carrying position.

42. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, said last mentioned means each comprising a plurality of members, each of which is adapted to coöperate with means on one of said releasing means to move the same to releasing position, and means controlled by said selecting device to operate a selected one of said members so as to discharge the contents of said article carriers at stations selected by said selecting device, one of said releasing means, being always in operative position to discharge all of said articles that are out of the range of selections of said selecting device from said machine.

43. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, said last mentioned means each comprising a plurality of members, each of which is adapted to coöperate with means on one of said releasing means to move the same to releasing position, means controlled by said selecting device to operate a selected one of said members so as to discharge the contents of said article carriers at stations selected by said selecting device, and means for returning said carriers to carrying position, one of said releasing means, being always in operative position to discharge all of said articles that are out of the range of selections of said selecting device from said machine.

44. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means for moving said tripping means into operative position, said last mentioned means being controlled by said selecting device, whereby said carriers are tripped at a selected discharge station, said carriers being provided with means adapted to discharge their contents in a plurality of directions.

45. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means for moving said tripping means into operative position, said last mentioned means being controlled by said selecting device, whereby said carriers are tripped at a selected discharge station, said carriers being provided with means adapted to discharge their contents in a plurality of directions, and means controlled by said selecting device for determining the direction of discharge of said carriers.

46. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means for moving said tripping means into operative position, said last mentioned means being controlled by said selecting device, whereby said carriers are tripped at a selected discharge station, said carriers being adapted to discharge their contents in a plurality of directions at each said station, the direction of discharge thereof being controlled by said selecting device.

47. In a machine of the character described, a plurality of article carriers, a selecting device, means for moving said article carriers successively into position so that the articles carried thereby will operate said selecting device, means for tripping said article carriers to discharge the contents thereof, one of said tripping means being located at each of a plurality of discharge stations along the path of movement of said carriers and means for moving said tripping means into operative position, said last mentioned means being controlled by said selecting device, whereby said carriers are tripped at a selected discharge station, said carriers being provided with means adapted to assume a plurality of angular positions, the position of said means being controlled by said selecting device, whereby said carriers are adapted to discharge the contents thereof in a plurality of different directions, to sort said articles into a plurality of groups at each of said stations.

48. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position and means controlled by said selecting device to set said last mentioned means so as to release the holding means at any station selected thereby, said carriers being provided with means adapted to discharge their contents in a plurality of directions at each said station, the direction of discharge thereof being controlled by said selecting device.

49. In a machine of the character described, a plurality of article carriers, means for holding said carriers in carrying position, a selecting device, means for moving said article carriers successively into position so that the articles carried thereby will operate said selecting device, means for releasing said holding means to dump said carriers, located at a plurality of discharge stations along the path of movement of said carriers, means for moving any one of said releasing means to operative position, said last mentioned means each comprising a plurality of members, each of which is adapted to coöperate with means on one of said releasing means to move the same to releasing position, and means controlled by said selecting device to operate a selected one of said members so as to discharge the contents of said article carriers at stations selected by said selecting device, said carriers being provided with means adapted to discharge their contents in a plurality of directions at each said station, the direction of discharge thereof being controlled by said selecting device.

50. In a machine of the character described, a plurality of article carriers, a selecting device, means for successively moving said carriers into the range of said selecting device and means for dumping said carriers at stations selected by said selecting device, said carriers being provided with means adapted to discharge their contents in a plurality of directions at each station, the direction of discharge thereof being controlled by said selecting device.

51. In a machine of the character described, a plurality of article carriers, a selecting device, means for successively moving said carriers into the range of said selecting device and means for dumping said carriers at stations selected by said selecting device, said carriers being provided with means mounted to provide a plurality of selections at each of said stations.

52. In a machine of the character described, a hopper, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and means for raising said carriers above said fingers, said carriers being provided with openings through which said fingers are adapted to pass as said carriers are raised, whereby said articles are transferred to said carriers one at a time.

53. In a machine of the character described, a hopper, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and a cam for raising said carriers above said fingers, said carriers being provided with openings through which said fingers are adapted to pass as said carriers are raised, whereby said articles are transferred to said carriers one at a time.

54. In a machine of the character described, a hopper, said hopper having a discharge opening through which the articles contained in said hopper are adapted to pass one at a time, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and means for raising said carriers above said fingers, said carriers being provided with openings through which said fingers are adapted to pass as said carriers are raised, whereby said articles are transferred to said carriers one at a time.

55. In a machine of the character described, a hopper, said hopper having a discharge opening through which the articles contained in said hopper are adapted to pass one at a time, means for agitating the contents of said hopper, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and means for raising said carriers above said fingers, said carriers being provided with openings through which said fingers are adapted to pass as said carriers are raised, whereby said articles are transferred to said carriers one at a time.

56. In a machine of the character described, a hopper, said hopper having a discharge opening through which the articles contained in said hopper are adapted to pass one at a time and said hopper having a false bottom, means for vibrating said false bottom, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and means for raising said carriers above said fingers, said carriers being provided with openings through which said fingers are adapted to pass as said carriers are raised, whereby said articles are transferred to said carriers one at a time.

57. In a machine of the character described, a hopper, a plurality of carriers arranged in a circular series and mounted to rotate about a common center in a step-by-step movement, said carriers being adapted to receive articles from said hopper, said carriers normally moving in a path below said hopper, and means for feeding said articles from said hopper to said carriers, comprising a plurality of fingers mounted adjacent the discharge opening of said hopper, means for raising said carriers above said fingers, said carriers being provided with openings through which said fingers are adapted to pass as said carriers are raised, whereby said articles are transferred to said carriers one at a time, and means for temporarily maintaining said carriers in their raised position.

58. In a machine of the character described, a hopper, a plurality of carriers arranged in a circular series and mounted to rotate about a common center in a step-by-step movement, said carriers being adapted to receive articles from said hopper, said carriers normally moving in a path below said hopper, and means for feeding said articles from said hopper to said carriers, comprising a plurality of fingers mounted adjacent the discharge opening of said hopper, means for raising said carriers above said fingers, said carriers being provided with openings through which said fingers are adapted to pass as said carriers are raised, whereby said articles are transferred to said carriers one at a time, means for temporarily maintaining said carriers in their raised position and means for returning said carriers to their normal level.

59. In a machine of the character described, a hopper, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and means for raising said carriers above said fingers, said carriers being provided with fingers adapted to pass between the fingers provided on said hopper and adapted to receive an article therefrom.

60. In a machine of the character described, a cigar hopper, a plurality of carriers adapted to receive cigars from said hopper, said carriers normally moving in a path below said hopper and means for feeding said articles from said hopper to said carriers comprising a plurality of fingers mounted adjacent the discharge opening of said hopper and adapted to receive cigars thereon from said hopper, and fingers on said carriers adapted to pass between said first mentioned fingers and lift a cigar therefrom onto said carriers.

61. In a machine of the character described, a hopper, said hopper having a discharge opening through which the articles contained in said hopper are adapted to pass one at a time and said hopper having a false bottom, means for vibrating said false bottom, said means comprising an arm connected to said false bottom, an eccentric strap secured to one end of said arm, and an eccentric driven by the main drive shaft of said machine mounted in said eccentric strap, a plurality of carriers adapted to receive articles from said hopper, said carriers normally moving in a path below said hopper, and means for feeding said articles from said hopper to said carriers, comprising a plurality of fingers mounted adjacent the discharge opening of said hopper, and means for raising said carriers above said fingers, said carriers being provided with openings through which said fingers are adapted to pass as said carriers are raised, whereby said articles are transferred to said carriers one at a time.

62. In a machine of the character described, a light responsive selecting device, a plurality of article carriers, means for actuating said carriers to sort said articles controlled by said selecting device, and means for actuating said carriers to move said articles one by one into coöperative relation with said selecting device.

63. In a machine of the character described, a light responsive selecting device, a plurality of article carriers normally moving in a path below said selecting device, sorting mechanism controlled by said selecting device, and means for raising said carriers to move said articles one by one into coöperative relation with said selecting device.

64. In a machine of the character described, a light responsive selecting device, a plurality of article carriers, sorting mechanism controlled by said selecting device, and a cam for actuating said carriers to move said articles one by one into coöperative relation with said selecting device.

65. In a machine of the character described, a light responsive selecting device, a plurality of article carriers normally moving in a path below said selecting device, sorting mechanism controlled by said selecting device, and a cam for raising said carriers to move said articles one by one into coöperative relation with said selecting device.

66. In a machine of the character described, a light responsive selecting device, a plurality of article carriers normally moving in a path below said selecting device, sorting mechanism controlled by said selecting device, means for raising said carriers to move said articles one by one into coöperative relation with said selecting device, and means for temporarily maintaining said carriers in raised position.

67. In a machine of the character described, a light responsive selecting device, a plurality of article carriers normally moving in a path below said selecting device, sorting mechanism controlled by said selecting device, means for raising said carriers to move said articles one by one into coöperative relation with said selecting device, means for temporarily maintaining said carriers in raised position, and means for returning said carriers to their normal level.

68. In a machine of the character described, a light responsive selecting device, a plurality of cigar carriers, mechanism for sorting said cigars according to the color thereof controlled by said selecting device, and means for actuating said carriers to move said cigars one by one into coöperative relation with said selecting device.

69. In a machine of the character described, a light responsive selecting device, a plurality of cigar carriers normally moving in a path below said selecting device, mechanism for sorting said cigars according to the color thereof controlled by said selecting device, a cam for raising said carriers to move said cigars one by one into coöperative relation with said selecting device, means for temporarily maintaining said carriers in raised position and means for returning said carriers to their normal level.

70. In a machine of the character described, a light responsive selecting device, a plurality of article carriers, said selecting device being provided with means for exposing the same area of all said articles thereto, sorting mechanism controlled by said selecting device, and means for actuating said carriers to move said articles one by one into coöperative relation with said selecting device.

71. In a machine of the character described, a light responsive selecting device, a plurality of article carriers, said selecting device being provided with means whereby the same area of all the articles is exposed to said selecting device, sorting mechanism controlled by said selecting device, and means for actuating said carriers to move said articles one by one into coöperative relation with said selecting device.

72. In a machine of the character described, a light responsive selecting device, a plurality of article carriers normally moving in a path below said selecting device, said selecting device being provided with means whereby the same area of all said articles is exposed to said selecting device, and means for raising said carriers to press said articles one by one against said screen and into coöperative relation with said selecting device.

73. In a machine of the character described, a light responsive selecting device, a plurality of article carriers normally moving in a path below said selecting device, said selecting device being provided with a screen whereby the same area of all said articles is exposed to said selecting device, means for raising said carriers to press said articles one by one against said screen and into coöperative relation with said selecting device, and means for illuminating said articles while in position against said screen.

74. In a machine of the character described, a light responsive selecting device, a plurality of article carriers, sorting mechanism controlled by said selecting device, said selecting device being provided with a screen, means for actuating said carriers to move said articles one by one into coöperative relation with said selecting device and said screen, and means for illuminating said articles while in position against said screen.

75. In a machine of the character described, a light responsive selecting device, a plurality of article carriers, sorting mechanism controlled by said selecting device, means for actuating said carriers to move said articles one by one into coöperative relation with said selecting device, and means for illuminating said articles while in position against said screen, said means comprising an elliptical reflecting member, a source of light at one of the focal points thereof, the other focal point thereof being located at the point where said articles are located when in coöperative relation with said selecting device.

76. In a machine of the character described, a light responsive selecting device, a plurality of article carriers normally moving in a path below said selecting device, said selecting device being provided with a screen whereby the same area of all said articles is exposed to said selecting device, means for raising said carriers to press said articles one by one against said screen and into coöperative relation with said selecting device, and means for illuminating said articles while in position against said screen, said means comprising an elliptical reflecting member, and a source of light at one of the focal points thereof, the other focal point thereof being located at the surface of said articles when in position against said screen.

77. In a machine of the character described, a hopper, a light responsive selecting device, a plurality of article carriers normally moving in a path below said hopper and said selecting device, sorting mechanism controlled by said selecting device, means for raising said carriers to receive articles from said hopper and means for raising said carriers to move said articles one by one into coöperative relation with said selecting device.

78. In a machine of the character described, a plurality of article carriers, a hopper adapted to deliver articles to said carriers, a light responsive selecting device, said carriers normally moving in a path below said hopper and said selecting device in a step by step motion, and means for raising said carriers above their normal position at a plurality of points to receive said articles one by one from said hopper and move them into coöperative relation with said selecting device.

79. In a machine of the character described, a plurality of article carriers, a hopper adapted to deliver articles to said carriers, a light responsive selecting device, said carriers normally moving in a path below said hopper and said selecting device in a step by step motion, and cams for raising said carriers above their normal position at a plurality of points to receive said articles one by one from said hopper and move them into coöperative relation with said selecting device.

80. In a machine of the character described, a plurality of article carriers, a hopper adapted to deliver articles to said carriers, a light responsive selecting device, said carriers normally moving in a path below said hopper and said selecting device in a step by step motion, means for raising said carriers above their normal position at a plurality of points to receive said articles one by one from said hopper and move them into coöperative relation with said selecting device, and means for temporarily maintaining said carriers in a raised position at said hopper and at said selecting device.

81. In a machine of the character described, a plurality of article carriers, a hopper adapted to deliver articles to said carriers, a light responsive selecting device, said carriers normally moving in a path below said hopper and said selecting device in a step by step motion, and means for raising and maintaining said carriers above their normal position at a plurality of points to receive said articles one by one from said hopper and move them into coöperative relation with said selecting device, said means comprising a plurality of cams and a pair of plungers coöperating with said cams and engaging said carriers.

82. In a machine of the character described, a plurality of article carriers, a hopper adapted to deliver articles to said carriers, a light responsive selecting device, said carriers normally moving in a path below said hopper and said selecting device in a step by step motion, and means for raising and maintaining said carriers above their normal position at a plurality of points to receive said articles one by one from said hopper and move them into coöperative relation with said selecting device, said means comprising a plurality of cams, a pair of plungers provided with rollers coöperating with said cams, and rollers on the lower ends of said carriers adapted to coöperate with said plungers to raise said carriers as said plungers are raised by said cams.

83. A machine of the character described, comprising a framework, a plurality of article carriers, a support for said carriers mounted in said framework to rotate in a horizontal plane, each of said article carriers comprising a body portion provided with a downward extension mounted to slide vertically in said support, an article holder mounted to turn about a pivot on said body portion, to discharge its contents and means for maintaining said holders in article carrying position, and means for raising each of said carriers relatively to said support at a plurality of points.

84. A machine of the character described, comprising a framework, a plurality of article carriers, a support for said carriers mounted in said framework to rotate in a horizontal plane by a step-by-step movement, each of said article carriers comprising a body portion provided with a downward extension mounted to slide vertically in said support, a normally horizontal article holder mounted to turn out of horizontal position about a pivot on said body portion, to discharge its contents and means for maintaining said holders in article carrying position, and means for raising each of said carriers relatively to said support at a plurality of points.

85. A machine of the character described comprising a framework, a plurality of article carriers, a support for said carriers mounted in said framework to rotate in a horizontal plane, each of said article carriers comprising a body portion, a normally horizontally extending article holder mounted to turn about a horizontal pivot on said body portion to discharge an article therefrom and means for maintaining said holders in article carrying position, and means on said framework for actuating said last mentioned means to release said holders to discharge the articles therefrom.

86. A machine of the character described comprising a framework, a plurality of article carriers, a support for said carriers mounted in said framework to rotate in a horizontal plane, each of said article carriers comprising a body portion, a normally horizontally extending article holder mounted to turn about a horizontal pivot on said body portion to discharge an article therefrom and means for maintaining said holders in article carrying position, and selectively controlled means on said framework for actuating said last mentioned means to release said holders to discharge the articles therefrom at a selected point.

87. A machine of the character described comprising a framework, a plurality of article carriers, a support for said carriers mounted in said framework to rotate in a horizontal plane, each of said article carriers comprising a body portion, a normally horizontally extending article holder mounted to turn about a horizontal pivot on said body portion to discharge an article therefrom and a catch for maintaining each of said holders in article carrying position, and means on said framework for releasing said catches, whereupon said holders automatically discharge the articles therefrom.

88. A machine of the character described comprising a framework, a plurality of article carriers, a support for said carriers mounted in said framework to rotate in a horizontal plane, each of said article carriers comprising a body portion, a normally horizontally extending article holder mounted to turn about a horizontal pivot on said body portion to discharge an article therefrom and a catch for maintaining each of said holders in article carrying position, and selectively controlled means mounted on said framework in spaced relation for releasing any one of said catches, whereupon the holder associated therewith automatically discharges the article carried thereby at a selected point.

89. A machine of the character described comprising a framework, a plurality of article carriers, a support for said carriers mounted in said framework to rotate in a horizontal plane, each of said article carriers comprising a body portion, a normally horizontally extending article holder mounted to turn about a horizontal pivot on said body portion to discharge an article therefrom and a catch for maintaining each of said holders in article carrying position, and selectively controlled means mounted on said framework in spaced relation for releasing any one of said catches, whereupon the holder associated therewith automatically discharges the article carried thereby at a selected point, said means comprising a plurality of members adapted to be projected radially outwardly into the path of movement of said catches.

90. A machine of the character described comprising a framework, a plurality of dumping article carriers mounted on said framework to rotate in a horizontal plane, catches for maintaining said carriers in article carrying position, and means on said framework for actuating said catches to release said carriers comprising a plurality of members adapted to be projected radially outwardly into the path of movement of said catches to engage therewith.

91. A machine of the character described comprising a framework, a plurality of dumping article carriers mounted on said framework to rotate in a horizontal plane, catches for maintaining said carriers in article carrying position having depending portions, and means on said framework for actuating said catches to release said carriers comprising a plurality of members adapted to be projected radially outwardly into the path of movement of the depending portions of said catches to engage therewith.

92. A machine of the character described comprising a framework, a plurality of dumping article carriers mounted on said framework to rotate in a horizontal plane, catches for maintaining said carriers in article carrying position having depending portions, and means on said framework for actuating said catches to release said carriers comprising a plurality of members adapted to be projected radially outwardly into the path of movement of the depending portions of said catches to engage therewith, said members being provided with means to retract them to normal position.

93. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of side catches to engage therewith, and means for projecting said members, comprising cams on said members and means for selectively engaging said cams controlled by said selecting device, to selectively project said members.

94. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of said catches to engage therewith, and means for projecting said members, comprising a cam on each of said members, each of said cams occupying a distinct radial position relative to the path of movement of said carriers, a plurality of members each provided with radially spaced means each adapted to be projected to engage one of said cams rotating with said carriers, and means controlled by said selecting device for projecting said cam engaging means.

95. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of said catches to engage therewith, and means for projecting said members, comprising a cam on each of said members, each of said cams occupying a distinct radial position relative to the path of movement of said carriers, a plurality of members each provided with radially spaced vertically extending pins each adapted to be projected upwardly to engage one of said cams, and means controlled by said selecting device for projecting any one of said pins.

96. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of said catches to engage therewith, and means for projecting said members, comprising a cam on each of said members, each of said cams occupying a distinct radial position relative to the path of movement of said carriers, a plurality of members each provided with radially spaced vertically extending pins each adapted to be projected upwardly to engage one of said cams, and means controlled by said selecting device for projecting any one of said pins, said means comprising electromagnetically operated plungers, there being one of said plungers for each of said pins.

97. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of said catches to engage therewith, and means for projecting said members, comprising a cam on each of said members, each of said cams occupying a distinct radial position relative to the path of movement of said carriers, a plurality of members each provided with radially spaced vertically extending pins each adapted to be projected upwardly to engage one of said cams, and means controlled by said selecting device for projecting any one of said pins, there being one of said members for each of said carriers, mounted slightly in advance thereof.

98. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of said catches to engage therewith, and means for projecting said members, comprising a cam on each of said members, each of said cams occupying a distinct radial position relative to the path of movement of said carriers, a plurality of members each provided with radially spaced vertically extending pins each adapted to be propected upwardly to engage one of said cams, means controlled by said selecting device for projecting any one of said pins, and means for returning said pins to retracted position.

99. A machine of the character described comprising a framework, a plurality of dumping article carriers mounted on said framework to rotate in a horizontal plane, a selecting device, catches for maintaining said carriers in article carrying position, and means for actuating said catches to release said carriers, said means comprising a plurality of members adapted to be projected radially outwardly into the path of movement of said catches to engage therewith, and means for projecting said members, comprising a cam on each of said members, each of said cams occupying a distinct radial position relative to the path of movement of said carriers, a plurality of members each provided with radially spaced vertically extending pins each adapted to be projected upwardly to engage one of said cams, means controlled by said selecting device for projecting any one of said pins, a cam for returning said pins to retracted position and means for holding said pins in retracted position.

100. A machine of the character described comprising a framework, a plurality of article carriers mounted to rotate on said framework in a horizontal plane, a plurality of concentric annular tracks mounted on said framework and means for directing the discharge of articles from said carriers in a plurality of directions, said means being mounted on a vertical pivot, and being provided with a member spaced from said pivot adapted to operate in any one of said tracks whereby said means is adapted to assume a plurality of angular positions.

101. A machine of the character described comprising a framework, a plurality of article carriers mounted to rotate on said framework in a horizontal plane, a plurality of concentric annular tracks mounted on said framework, means for directing the discharge of articles from said carriers in a plurality of directions, said means being mounted on a vertical pivot, and being provided with a member spaced from said pivot adapted to operate in any one of said tracks whereby said means is adapted to assume a plurality of angular positions, and selectively controlled means for directing said last mentioned member into any one of said tracks.

102. In a machine of the character described, a main shaft, a plurality of article carriers, a plurality of cams for raising said article carriers mounted to turn with said main shaft, and means for imparting a rotary step-by-step motion to said article carriers whereby said article carriers are adapted to advance a step for each revolution of said main shaft.

103. In a machine of the character described a plurality of article carriers, a selecting station and a plurality of sorting stations in the path of movement of said carriers, a light responsive selecting device at said selecting station, and means operated by said selecting device whereby said carriers will deposit said articles in accordance with the selection of said selecting device at said sorting stations.

104. In a machine of the character described, an electrically operated selecting device having movable contacts, a main shaft, and means turning with said main shaft for closing said contacts and subsequently closing said circuit.

105. In a machine of the character described, an electrically operated selecting device having movable contacts, a main shaft, and means turning with said main shaft for opening said circuit and subsequently separating said contacts.

106. In a machine of the character described, an electrically operated selecting device having movable contacts, a main shaft, and means turning with said main shaft for closing said contacts and subsequently closing said circuit and for opening said circuit and subsequently separating said contacts.

107. In a machine of the character described, an electrically operated selecting device having movable contacts, a main shaft, and cams turning with said main shaft for closing said contacts and subsequently closing said circuit and for opening said circuit and subsequently separating said contacts.

108. In a machine of the character described, a plurality of article carriers, means for holding said carriers in carrying position, a selecting device, means for moving said articles one at a time into the range of said selecting device, means for releasing said holding means to dump said carriers located at a plurality of discharge stations along the path of movement of said carriers, means for moving any one of said releasing means to operative position, said last mentioned means each comprising a plurality of members, each of which is adapted to cooperate with means on one of said releasing means to move the same to releasing position, and means controlled by said selecting device to operate a selected one of said members so as to discharge the contents of said article carriers at stations selected by said selecting device, one of said releasing means being always in operative position to discharge all of said articles that are out of the range of selections of said selecting device from said machine.

109. In a machine of the character described, a plurality of article carriers, a selecting device, means for moving said articles one at a time into the range of said selecting device, means for tripping said article carriers to discharge the contents thereof, one of said tripping means being located at each of a plurality of discharge stations along the path of movement of said carriers and means for moving said tripping means into operative position, said last mentioned means being controlled by said selecting device, whereby said carriers are tripped at a selected discharge station, said carriers being provided with means adapted to discharge their contents in a plurality of directions.

110. In a machine of the character described, a plurality of article carriers, means for holding said carriers in carrying position, a selecting device, means for moving said articles one at a time into the range of said selecting device, means for releasing said holding means to dump said carriers, located at a plurality of discharge stations along the path of movement of said carriers, means for moving any one of said releasing means to operative position and means controlled by said selecting device to set said last mentioned means so as to release the holding means at any station selected thereby, said carriers being provided with means adapted to discharge their contents in a plurality of directions at each said station, the direction of discharge thereof being controlled by said selecting device.

111. In a machine of the character described, a plurality of article carriers, a selecting device, means for moving said articles one at a time into the range of said selecting device, and means for dumping said carriers at stations selected by said selecting device, said carriers being provided with means adapted to discharge their contents in a plurality of directions at each station, the direction of discharge thereof being controlled by said selecting device.

112. In a machine of the character described, a plurality of article carriers, a selecting device, means for moving said articles one at a time into the range of said selecting device, and means for dumping said carriers at stations selected by said selecting device, said carriers being provided with means mounted to provide a plurality of selections at each of said stations.

113. In a machine of the character described a light responsive selecting device, a plurality of article carriers, said selecting device being provided with means for exposing the same area of all said articles thereto, sorting mechanism controlled by said selecting device, and means for moving said articles one by one into coöperative relation with said selecting device.

114. In a machine of the character described a light responsive selecting device, a plurality of article carriers, said selecting device being provided with a screen for exposing the same area of all said articles thereto, sorting mechanism controlled by said selecting device, and means for pressing said articles one by one against said screen and into coöperative relation with said selecting device.

115. In a machine of the character described a plurality of article carriers, a selecting station, a plurality of sorting stations in the path of movement of said carriers, a single light responsive selecting device at said selecting station, and means operated by said selecting device whereby said carriers will deposit said articles in accordance with the selection of said selecting device at said sorting stations.

116. In a machine of the character described a plurality of article carriers, a selecting station, a plurality of sorting stations in the path of movement of said carriers, a light responsive selecting device at said selecting station, and means electrically operated by said selecting device whereby said carriers will deposit said articles in accordance with the selection of said selecting device at said sorting stations.

In witness whereof, I hereunto subscribe my name this 19th day of October, A. D., 1920.

LESTER L. LADD.